US009088222B2

(12) United States Patent
Irish

(10) Patent No.: US 9,088,222 B2
(45) Date of Patent: Jul. 21, 2015

(54) SYSTEMS, METHODS, AND APPARATUS FOR A HIGH POWER FACTOR SINGLE PHASE RECTIFIER

(75) Inventor: Linda S. Irish, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 404 days.

(21) Appl. No.: 13/455,910

(22) Filed: Apr. 25, 2012

(65) Prior Publication Data
US 2013/0128638 A1  May 23, 2013

Related U.S. Application Data

(60) Provisional application No. 61/561,184, filed on Nov. 17, 2011.

(51) Int. Cl.
*H02M 7/06* (2006.01)
*H02M 1/42* (2007.01)

(52) U.S. Cl.
CPC .......... *H02M 1/4208* (2013.01); *H02M 1/4225* (2013.01); *H02M 1/4266* (2013.01); *H02M 7/06* (2013.01); *Y02B 70/123* (2013.01)

(58) Field of Classification Search
CPC ........................ H02M 3/28; H02M 2001/0006
USPC .................................. 363/16–17, 88, 125–132
See application file for complete search history.

(56) References Cited

U.S. PATENT DOCUMENTS

| 3,641,420 | A |   | 2/1972  | Richman |
|---|---|---|---|---|
| 5,006,973 | A | * | 4/1991  | Turner ............................ 363/34 |
| 5,532,917 | A |   | 7/1996  | Hung |
| 5,907,481 | A | * | 5/1999  | Svardsjo ......................... 363/25 |
| 5,953,223 | A | * | 9/1999  | Kato et al. ...................... 363/69 |
| 6,392,902 | B1 | * | 5/2002  | Jang et al. ....................... 363/17 |
| 6,490,177 | B1 | * | 12/2002 | Figueroa .................... 363/21.03 |

(Continued)

FOREIGN PATENT DOCUMENTS

| JP | H07194123 A | 7/1995 |
|---|---|---|
| JP | H08289555 A | 11/1996 |

(Continued)

OTHER PUBLICATIONS

International Search Report and Written Opinion—PCT/US2012/064840—ISA/EPO—Jan. 23, 2013.

(Continued)

*Primary Examiner* — Timothy J Dole
*Assistant Examiner* — Yusef Ahmed
(74) *Attorney, Agent, or Firm* — Knobbe Martens Olson & Bear LLP

(57) ABSTRACT

Systems, methods and apparatus are disclosed for broadband AC to DC conversion. In one aspect, a power conversion apparatus for providing direct current (DC) based at least in part on an alternating current is provided. The power conversion apparatus includes a first rectifier circuit configured to rectify the alternating current to a first direct current. The power conversion apparatus further includes an averaging circuit configured to average the first direct current received from the first rectifier circuit and to provide a second direct current. The power conversion apparatus further includes a second rectifier circuit configured to rectify the alternating current to a third direct current. The direct current is derived from the second direct current and the third direct current.

31 Claims, 18 Drawing Sheets

(56) References Cited

U.S. PATENT DOCUMENTS

| | | | |
|---|---|---|---|
| 7,149,097 | B1 | 12/2006 | Shteynberg et al. |
| 7,215,100 | B2 | 5/2007 | Velhner et al. |
| 7,417,485 | B1 | 8/2008 | Vecera |
| 7,859,872 | B1* | 12/2010 | Johns .............................. 363/89 |
| 7,880,577 | B1* | 2/2011 | Glaser et al. ................. 336/184 |
| 2005/0041439 | A1* | 2/2005 | Jang et al. ....................... 363/17 |
| 2006/0114697 | A1* | 6/2006 | Yasumura ....................... 363/16 |
| 2007/0006912 | A1* | 1/2007 | Kwon et al. .................. 136/256 |
| 2009/0295300 | A1* | 12/2009 | King ......................... 315/209 R |
| 2011/0134673 | A1* | 6/2011 | Ho et al. ....................... 363/127 |
| 2011/0194206 | A1* | 8/2011 | Sase et al. ....................... 360/75 |
| 2011/0235380 | A1* | 9/2011 | Tseng et al. .................. 363/127 |
| 2012/0039092 | A1* | 2/2012 | Xu et al. ......................... 363/17 |
| 2012/0039102 | A1* | 2/2012 | Shinoda ........................ 363/123 |
| 2012/0170337 | A1* | 7/2012 | Lisi et al. ...................... 363/126 |
| 2013/0077361 | A1* | 3/2013 | Low et al. ....................... 363/48 |
| 2013/0147279 | A1* | 6/2013 | Muratov ........................ 307/104 |
| 2013/0194698 | A1* | 8/2013 | Sase et al. ....................... 360/75 |
| 2013/0194838 | A1* | 8/2013 | Jang et al. ....................... 363/37 |

FOREIGN PATENT DOCUMENTS

| | | |
|---|---|---|
| JP | H1032981 A | 2/1998 |
| JP | 2005027400 A | 1/2005 |
| JP | 2010239690 A | 10/2010 |

OTHER PUBLICATIONS

Contenti, et al., "A new Circuit for Low-Cost Electronic Ballast Passive Valley Fill with additional Control Circuits for Low Total Harmonic Distortion and Low Crest Factor", International Rectifier, Dec. 2004, pp. 1-27.

Nishida et al., "Passive PFC converter for energy saving Efficient and Cheap Diode Rectifier Topology", 8th International Conference on Power Electronics—ECCE Asia, IEEE, 2011, pp. 1073-1076.

Japanese Office Action dated May 18, 2015 in corresponding Application No. 2014-542377, filed Nov. 13, 2012.

\* cited by examiner

SYSTEMS, METHODS, AND APPARATUS FOR A HIGH POWER FACTOR SINGLE PHASE RECTIFIER

CROSS REFERENCE TO RELATED APPLICATIONS

This application claims benefit under 35 U.S.C. §119(e) to U.S. Provisional Patent Application No. 61/561,184 entitled "HIGH POWER FACTOR SINGLE PHASE RECTIFIER" filed on Nov. 17, 2011, the disclosure of which is hereby incorporated by reference in its entirety.

FIELD

The invention relates generally to broadband alternating current (AC) to direct current (DC) conversion. More specifically, the disclosure is directed to a high power factor single phase rectifier topology for broadband AC to DC conversion.

BACKGROUND

A large number and variety of systems are powered and operated using direct current (DC). For example, a variety of electronic device are powered using DC that include, for example, mobile phones, portable music players, laptop computers, tablet computers, computer peripheral devices, communication devices (e.g., Bluetooth devices), digital cameras, hearing aids, and the like. In addition, batteries, such as in electric vehicles, are also charged using DC and provide a DC output. Many power sources used to provide power to electronic devices or for charging batteries provide alternating current (AC). Alternating current is often used for providing power due to relative advantages in the distance power may be transferred efficiently as well as for efficiencies in generating AC as compared to DC. As a result, power conversion circuitry is required in many systems for converting AC to DC. For example, when charging batteries or powering devices with DC, a power supply is generally used that receives AC and converts the AC to DC for use in charging or powering batteries or devices relying on DC. As power is often lost during the conversion, systems that increase efficiency of AC to DC conversion are desirable.

SUMMARY

One aspect of the subject matter described in the disclosure provides a power conversion apparatus for providing direct current (DC) based at least in part on an alternating current. The power conversion apparatus includes a first rectifier circuit configured to rectify the alternating current to a first direct current. The power conversion apparatus further includes an averaging circuit configured to average the first direct current received from the first rectifier circuit and to provide a second direct current. The power conversion apparatus further includes a second rectifier circuit configured to rectify the alternating current to a third direct current. The direct current is derived from the second direct current and the third direct current.

Another aspect of the subject matter described in the disclosure provides an implementation of a method for power conversion for providing direct current (DC) based at least in part on an alternating current. The method includes rectifying the alternating current to a first direct current via a first rectifier circuit. The method further includes averaging the first direct current via an averaging circuit to provide a second direct current. The method further includes rectifying the alternating current to a third direct current via a second rectifier circuit. The method further includes providing the direct current derived from the second direct current and the third direct current.

Yet another aspect of the subject matter described in the disclosure provides a power conversion apparatus for providing direct current (DC) based at least part on an alternating current. The power conversion apparatus includes means for rectifying the alternating current to a first direct current. The power conversion apparatus further includes means for averaging the first direct current to provide a second direct current. The power conversion apparatus further includes means for rectifying the alternating current to a third direct current. The power conversion apparatus further includes means for providing the direct current derived from the second direct current and the third direct current.

DETAILED DESCRIPTION

The detailed description set forth below in connection with the appended drawings is intended as a description of exemplary embodiments of the invention and is not intended to represent the only embodiments in which the invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. In some instances, some devices are shown in block diagram form.

As noted above, many power applications employ alternating current (AC) to direct current (DC) conversion so as to convert power, for example, from a utility grid so that it may be used to charge batteries or to power electronic devices that rely on DC.

Figure 1:
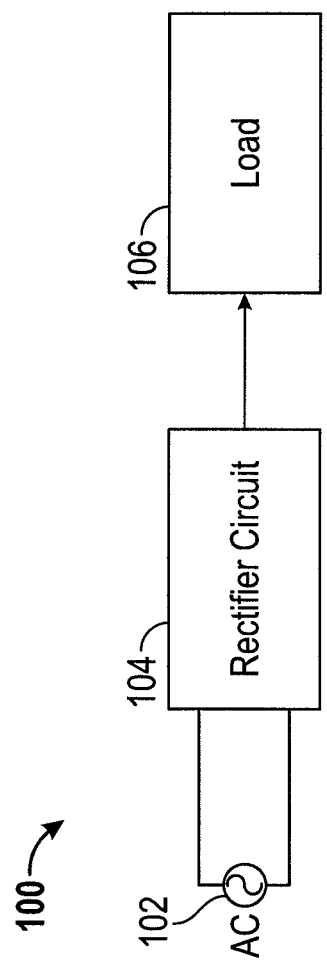
FIG. 1 is a functional block diagram of an exemplary system for AC to DC conversion.

FIG. 1 is a functional block diagram of an exemplary system 100 for AC to DC conversion. The system 100 includes a power source 102 that may provide a time varying voltage to produce a single phase alternating current (AC). The power source 102 may be any source of power that provides a time varying voltage producing an alternating current (AC). A rectifier circuit 104 may receive the AC from the power supply 102 and rectify the alternating current to constant direct current (DC). The direct current output from the rectifier circuit 104 is provided to power or charge a load 106. The load 106, for example, might be a battery configured to be charged. The load 106 may also be any other circuit that uses direct current such as an integrated circuit in an electronic device or any other circuit.

Rectification of high frequency AC to DC may result in harmonic distortion that reduces the efficiency of the rectifier circuit 104 and creates undesirable emissions. Some rectifier circuits may not work at high frequencies, may require resonant filters, have poor efficiency, or require polyphase AC power. For example, active power correction may be used for utility line frequencies. However, as active power correction may require switching power supplied several times the power line frequency, it may be impracticable for frequencies above a few KHz. Valley fill topologies may be used, however, the load current may fluctuate with the incoming power and therefore may not be practicable above a few KHz. Resonant filter networks may also be used to remove harmonics. The filter networks, however, may require precise inductor and capacitor values, and therefore may only be suitable over a narrow range of frequencies. Multipulse rectifier topologies may also used for polyphase power, however, these may only be suitable for three phase power networks. As such, a rectifier topology is needed that may function over a wide range of frequencies while also providing a high power factor and reduced harmonics using single phase power.

Figure 2:
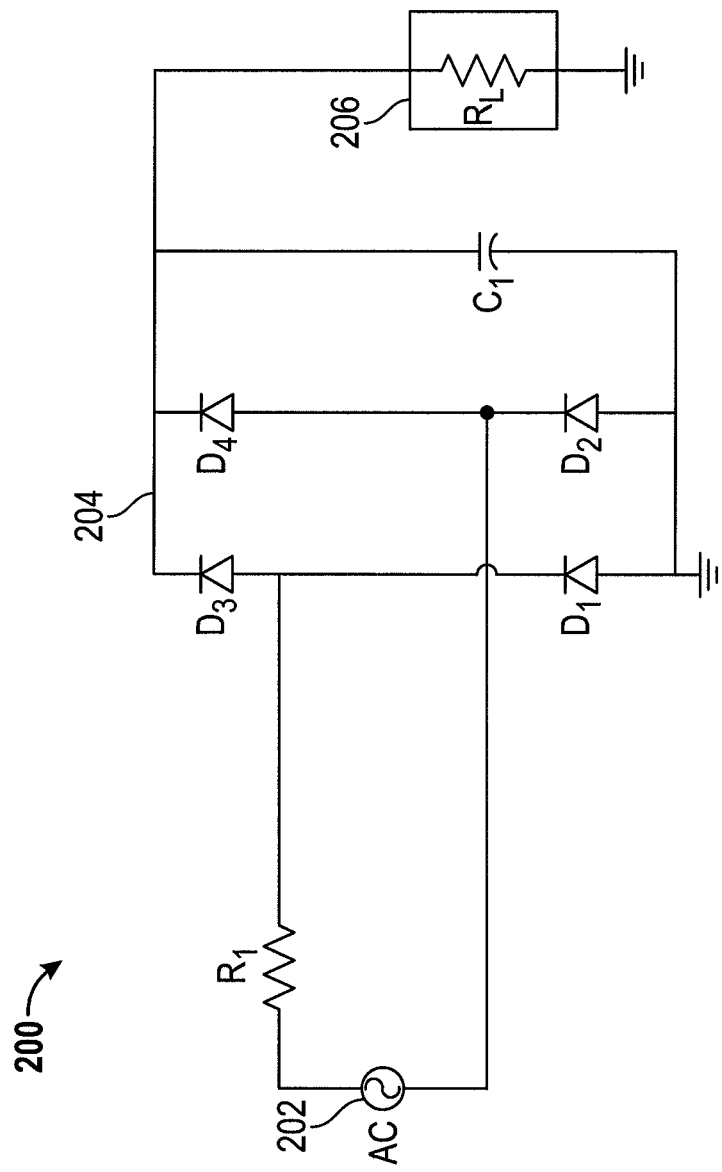
FIG. 2 is a schematic diagram of an exemplary system for AC to DC conversion as shown in FIG. 1 including a full wave bridge rectifier circuit.

FIG. 2 is a schematic diagram of an exemplary system 200 for AC to DC conversion as shown in FIG. 1 including a full wave bridge rectifier circuit 204. A rectifier circuit 204 may be configured to receive a single phase time-varying alternating current generated by a power source 202 and convert the received AC to DC that may be provided to a load $R_L$ 206. The rectifier circuit 204 may be a full wave bridge rectifier including diodes D1, D2, D3, D4 to rectify the AC received from the power source 202 to direct current. The rectified DC may be smoothed by the capacitor $C_1$ to provide a constant DC to the load $R_L$ 206.

Figure 3:
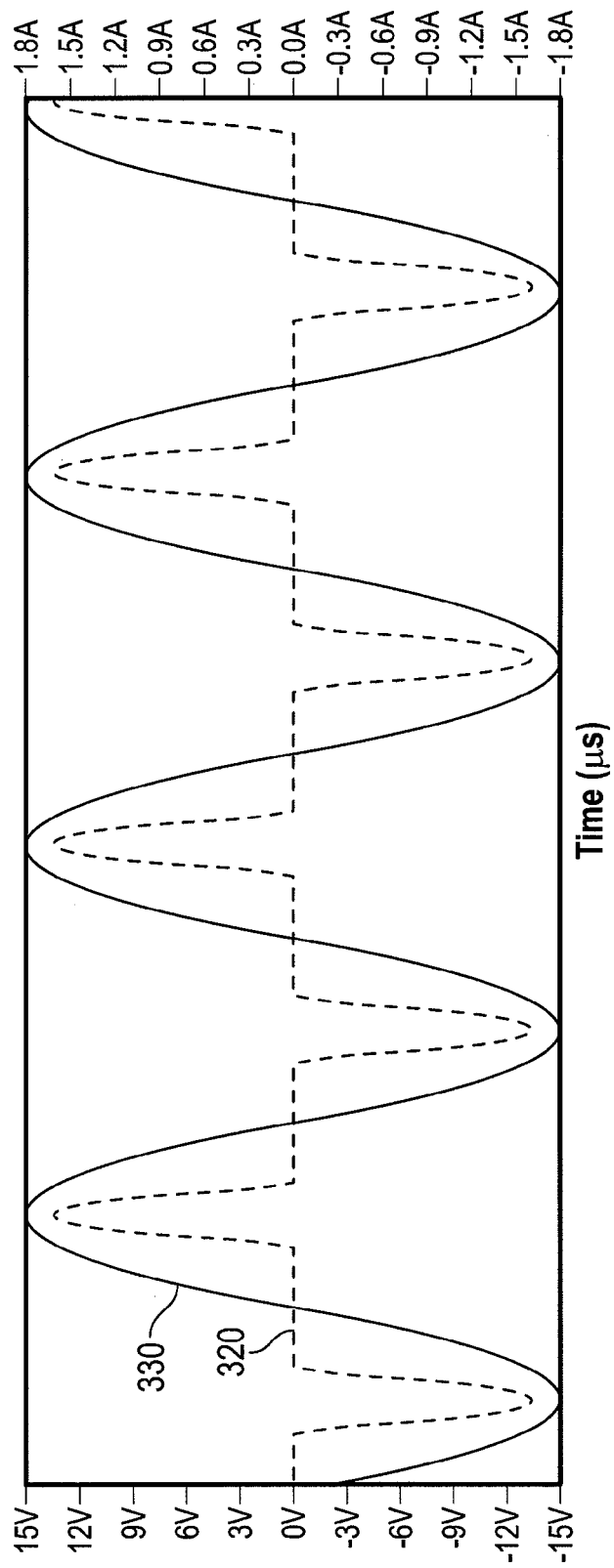
FIG. 3 is a plot of exemplary voltage and current waveforms of the full wave bridge rectifier circuit as shown in FIG. 2.

FIG. 3 is a plot of exemplary voltage and current waveforms 330 and 320 of the full wave bridge rectifier circuit 204 as shown in FIG. 2. As shown, the voltage waveform 330 from the power source 202 provides an undistorted sinusoidal shape. Ideally, the current waveform 320 in the rectifier circuit 204 would mirror the voltage waveform 330 and also have a corresponding undistorted sinusoidal shape. However, due to harmonic distortions, etc., as described above, the current waveform 320 of the rectifier circuit 204 has a wide step with narrow peaks and valleys. As a result of the distortions, the efficiency of the system 200 is reduced. More specifically, the power factor (i.e., the ratio of the real power flowing to the load 206 to the apparent power of the rectifier circuit 204) is reduced. Non-linear operation of the load 206 may also result in distortion to the current waveform 320 resulting in a reduced power factor. A low power factor indicates that less power is supplied to the load 206 than is available in the circuit. As a result, efficiency in the system 200 is reduced.

Figure 4:
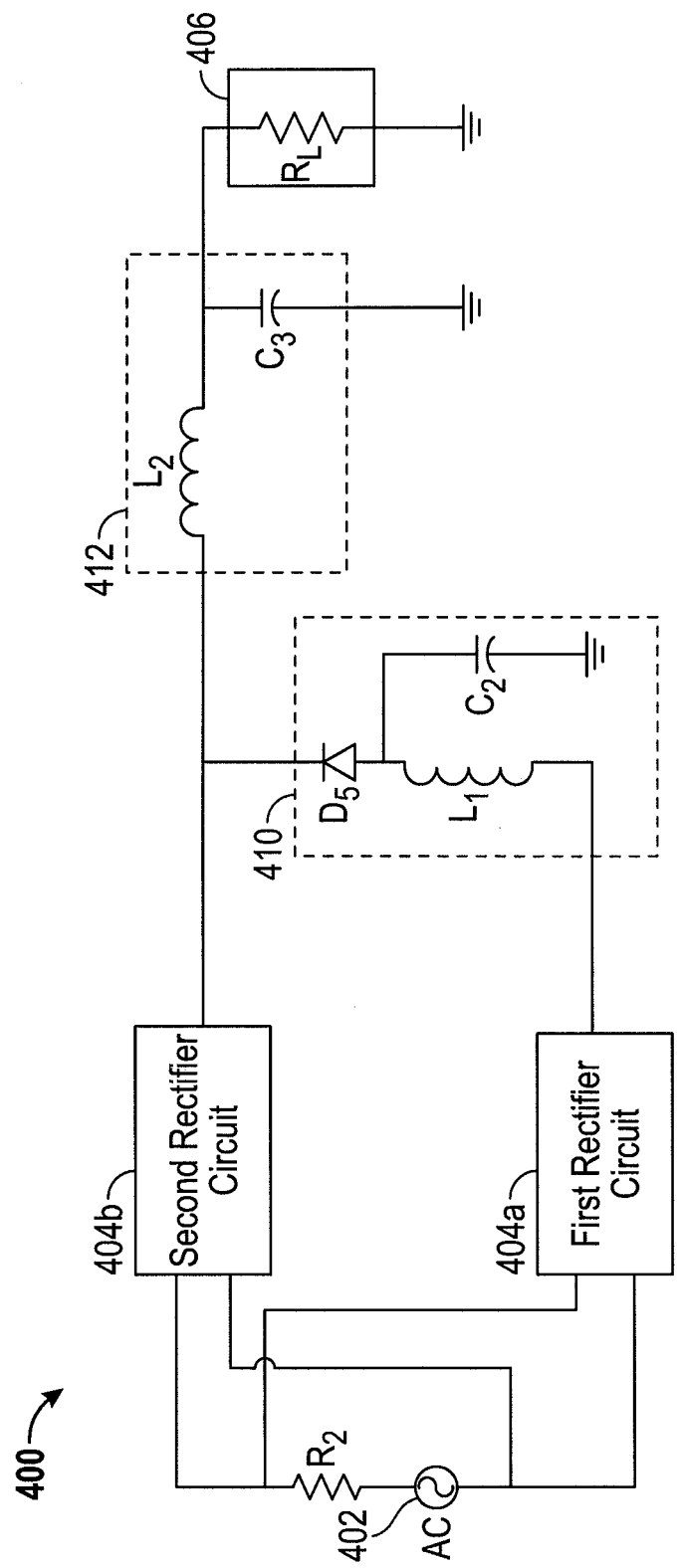
FIG. 4 is a schematic diagram of another exemplary system for AC to DC conversion.

FIG. 4 is a schematic diagram of another exemplary system 400 for AC to DC conversion, in accordance with one embodiment. The single phase AC power source 402 provides AC to a first and a second rectifier circuit 404a and 404b. The first rectifier circuit 404a and the second rectifier circuit 404b may be formed of a variety different types of rectifier circuits and rectifier circuit topologies as will be further described below. Regardless of the topology used, the first rectifier circuit 404a and the second rectifier circuit 404b may rectify the alternating current from the power source 402 into a direct current. The first rectifier circuit 404a may be configured to rectify the alternating current from the power source 402 to a first direct current provided at the output.

The first direct current may be received by an averaging circuit 410 that may average the output of the first rectifier circuit 404a. The operation of the averaging circuit 410 may cause the output of the averaging circuit 410 to be less than the peak voltage of the output of the second rectifier circuit 404b. The averaging circuit 410 may comprise an inductor $L_1$ and a capacitor $C_2$. The inductor $L_1$ and capacitor $C_2$ may be electrically connected in parallel. The inductance of the inductor $L_1$ and capacitor $C_2$ may be chosen according to a variety of design parameters and operating conditions of the system 400. The averaging circuit 410 may further include a diode $D_5$. The averaging circuit 410 may provide a second direct current that is derived from the first direct current output from the first rectifier circuit 404a.

The second rectifier circuit 404b may also rectify the alternating current from the power source 402 to produce a third direct current. The output of the averaging circuit 410 and the output of the second rectifier circuit 404a are electrically connected to form a common output such that the second direct current output from the averaging circuit 410 is combined with the third direct current output from the second rectifier circuit 404a. In one aspect, the minimum output of the second rectifier circuit 404b may be limited by the output of the averaging circuit 410 as the outputs are electrically connected. In one aspect, this may result in a current waveform of the system 400 that is a stepped waveform that more closely approximates a sinusoidal waveform. As a result of the operation of the system 400, harmonics are reduced and the power factor is increased. In one aspect, the first rectifier circuit 404a may be characterized as a lower voltage rectifier circuit and the second rectifier circuit 404b may be characterized as a higher voltage rectifier circuit as compared to the first rectifier circuit 404a. The direct current output from the second rectifier circuit 404b and the averaging circuit 410 may be further filtered by a filter circuit 412 that may, among other things, provide a substantially constant DC to be provided to a load $R_L$ 406. The filter circuit 412 may also be configured to provide increases in the power factor and reduction of undesirable harmonics. The filter circuit 412 may comprise an inductor $L_2$ and a capacitor $C_3$.

Figure 5:
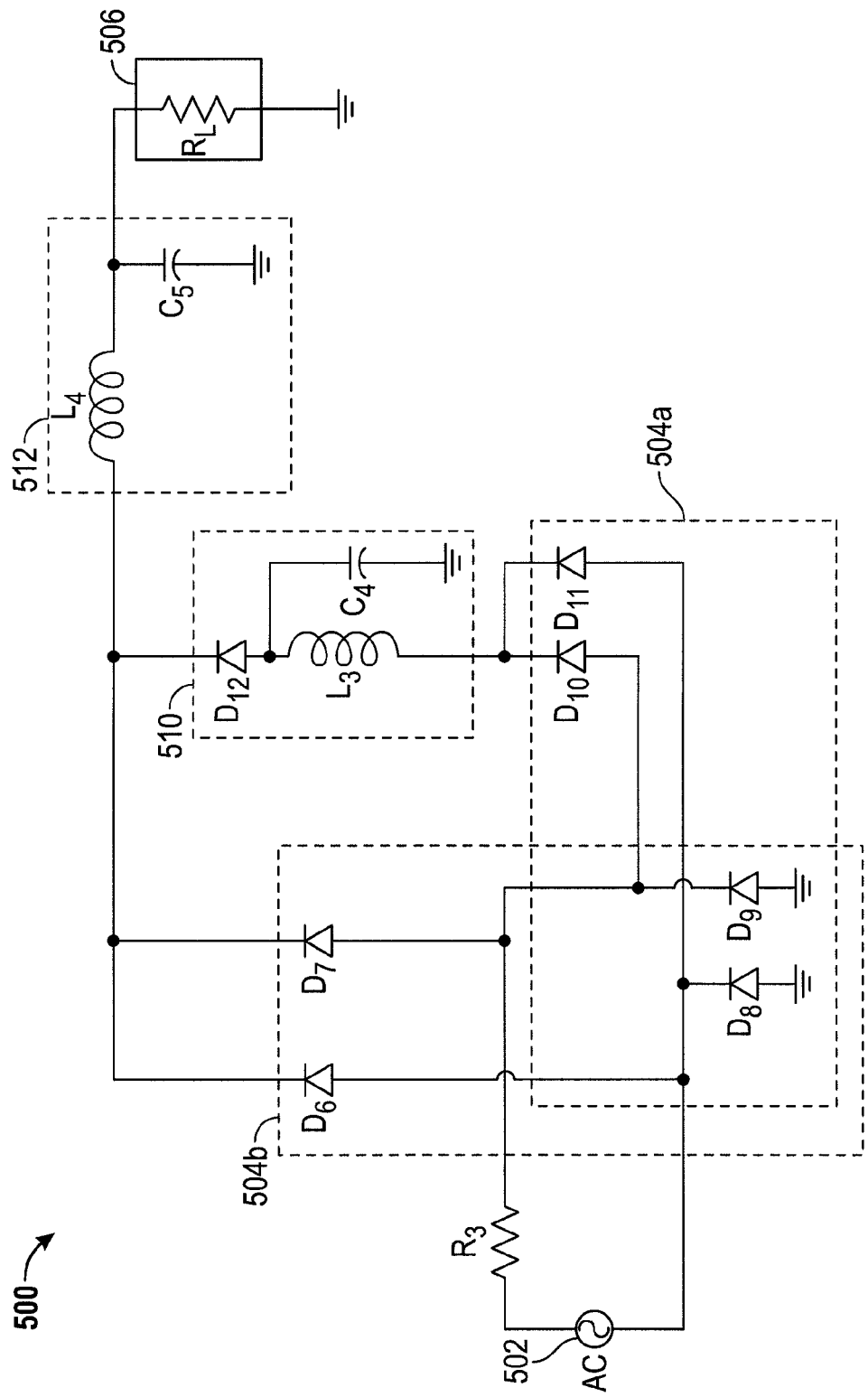
FIG. 5 is a schematic diagram of another exemplary system for AC to DC conversion.

FIG. 5 is a schematic diagram of another exemplary system 500 for AC to DC conversion, in accordance with one embodiment. FIG. 5 shows a schematic diagram of exemplary first and rectifier circuits 504a and 504b that may be used in accordance with the system 400 of FIG. 4. The first rectifier circuit 504a includes a full bridge rectifier circuit topology including diodes $D_8$, $D_9$, $D_{10}$, and $D_{11}$ and is configured to rectify the single phase alternating current from the power source 502 to a first direct current at the output. The second rectifier circuit 504b comprises a full bridge rectifier circuit topology including diodes $D_6$, $D_7$, $D_8$, and $D_9$ to also rectify the alternating current from the power source 502 to a second direct current. As shown in FIG. 5, the first and the second rectifier circuits 504a and 504b may share components such as the diodes $D_8$ and $D_9$. As shown, each of the first rectifier circuit and the second rectifier circuit 504a and 504b may be full bridge rectifier circuits.

The output of the first rectifier circuit 504b, as first direct current, is provided to an averaging circuit 510 including inductor $L_3$, capacitor $C_4$, and diode $D_{12}$. The output of the averaging circuit 510 is electrically connected to the output of the second rectifier circuit 504b. The combined direct current output is filtered by a filter circuit 512 including inductor $L_4$ and capacitor $C_5$ that may in one aspect smooth the output to provide constant DC. The output is then provided to a load $R_L$ 506. As shown, a full wave bridge rectifier circuit including diodes $D_6$, $D_7$, $D_8$, and $D_9$ is electrically connected in series with diodes $D_{10}$ and $D_{11}$. The topology for the first and second rectifier circuits 504a and 504b shown in FIG. 5 may be simplified as compared to other topologies as described below. Reducing the number components may provide various benefits such as lower cost or for increased efficiency.

Figure 6:
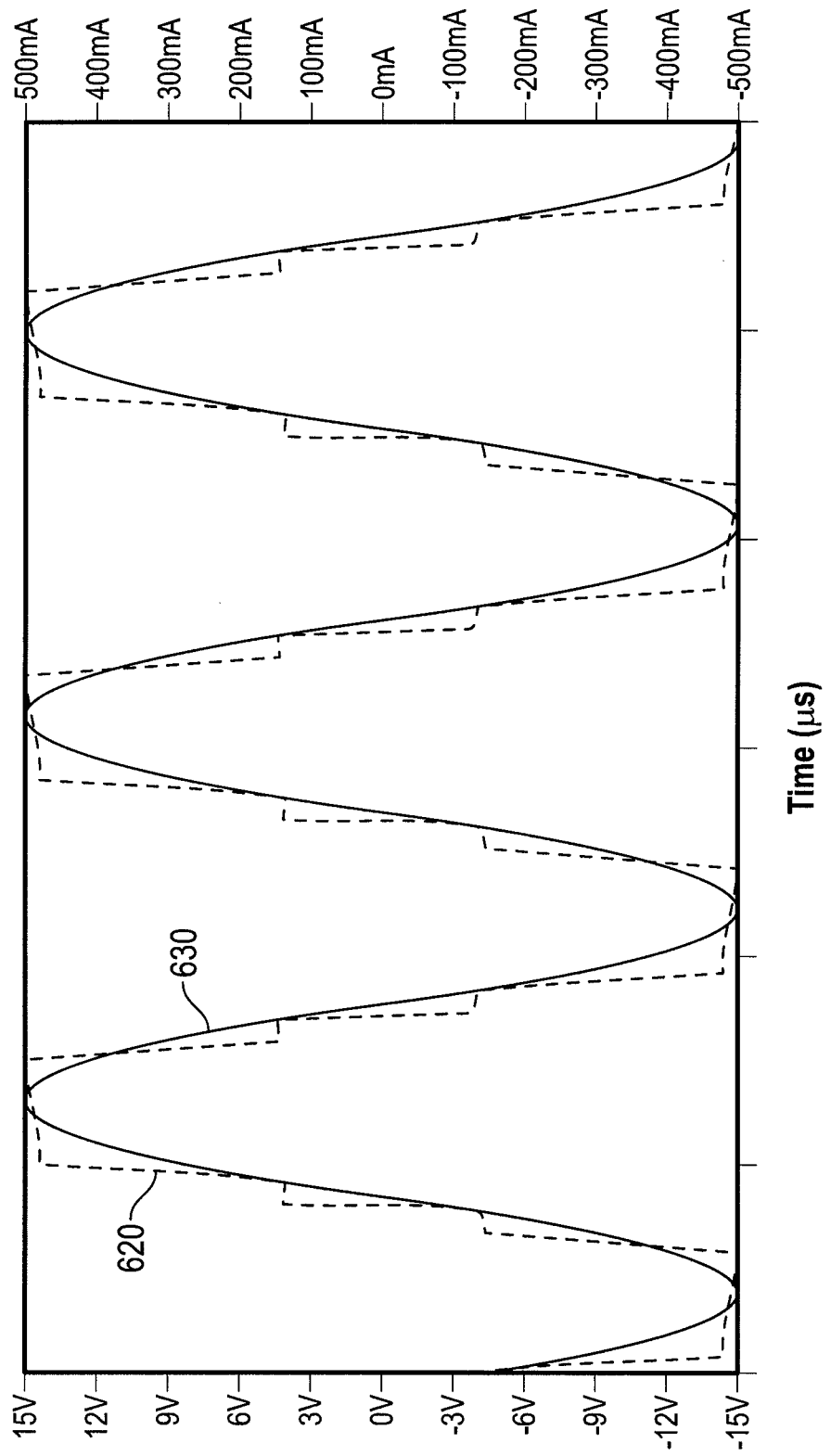
FIG. 6 is a plot of exemplary voltage and current waveforms of the system as shown in FIG. 5.

FIG. 6 is a plot of exemplary voltage and current waveforms 630 and 620 of the system 500 as shown in FIG. 5. As shown, the voltage waveform 630 has an undistorted sinusoidal shape. The current waveform 620 of the system 500, creates a stepped current waveform 620 that more closely approximates an undistorted wave, particularly as compared to the current waveform 320 of FIG. 3. As indicated by the less distorted current waveform 620, the system 500 may provide significant harmonic reductions and increased power factor. It should be appreciated that the values of voltage and current of FIG. 6 and other FIGs. provide hypothetical values for purposes of illustration and a variety of different values and levels are possible. Because the system 500 may be non-resonant, the system 500 may be used over a wide range of frequencies. By using a combination of rectifier topologies as shown in FIGS. 4 and 5, the current waveform may more closely approximate a sine wave and the operation of the system may allow for avoiding some of the problems as described above with respect to undesired harmonics and reduced power factors. A wide range of component values for the various components shown in FIGS. 4 and 5 may be used while still providing a high power factor so that the systems 400 and 500 may be designed for a wide range of frequencies and operating conditions.

Figure 7:
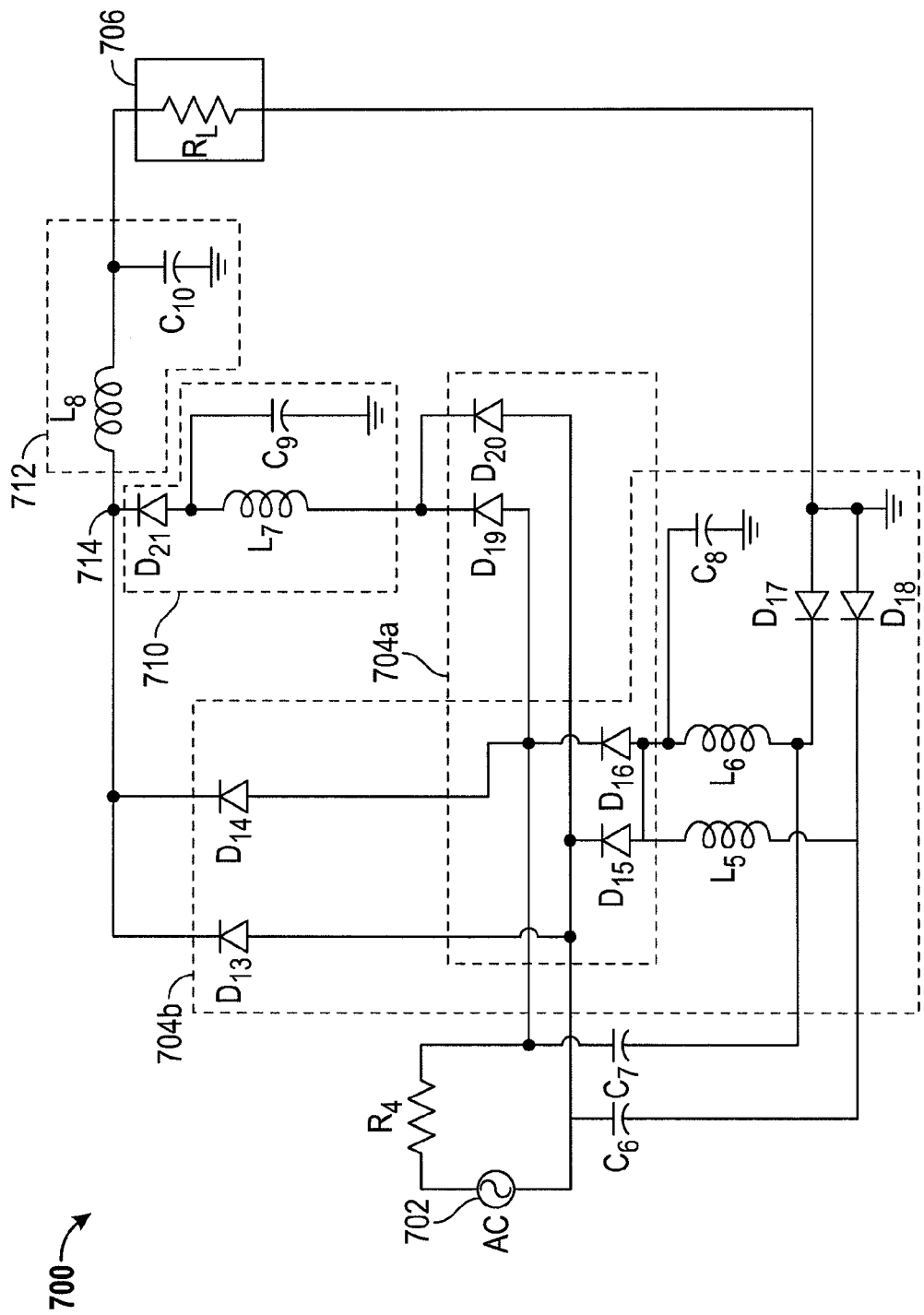
FIG. 7 is a schematic diagram of another exemplary system for AC to DC conversion.

FIG. 7 is a schematic diagram of another exemplary system 700 for AC to DC conversion, in accordance with one embodiment. FIG. 7 shows a schematic diagram of other exemplary first and rectifier circuits 704a and 704b that may be used in accordance with the system 400 of FIG. 4. The first rectifier circuit 704a includes a full bridge rectifier circuit including diodes $D_{15}$, $D_{16}$, $D_{19}$, and $D_{20}$. The second rectifier circuit 704b includes a full bridge rectifier circuit including diodes $D_{13}$, $D_{14}$, $D_{15}$, $D_{16}$. The second rectifier circuit 704b also includes a current doubler rectifier circuit including inductors $L_5$ and $L_6$. Furthermore, additional diodes $D_{17}$ and $D_{18}$ may be included as shown. A capacitor $C_8$ may also be included as shown. Similar to the system 500 shown in FIG. 5, the first rectifier circuit 704a and the second rectifier circuit 704b may share various components. In this configuration, the current doubler circuit may be positioned towards the bottom of the system 700 relative to the load $R_L$ 706. As shown in the previous FIGS. 4 and 5, the output of the first rectifier circuit 704a is connected to an averaging circuit 710. The output of the second rectifier circuit 704b is electrically connected to the output of the averaging circuit 710 at, for example, node 714. A filter circuit 712 is used to filter and/or smooth the direct current at node 714 to provide a constant DC to the load $R_L$ 706 as described above with reference to FIGS. 4 and 5.

Figure 8:
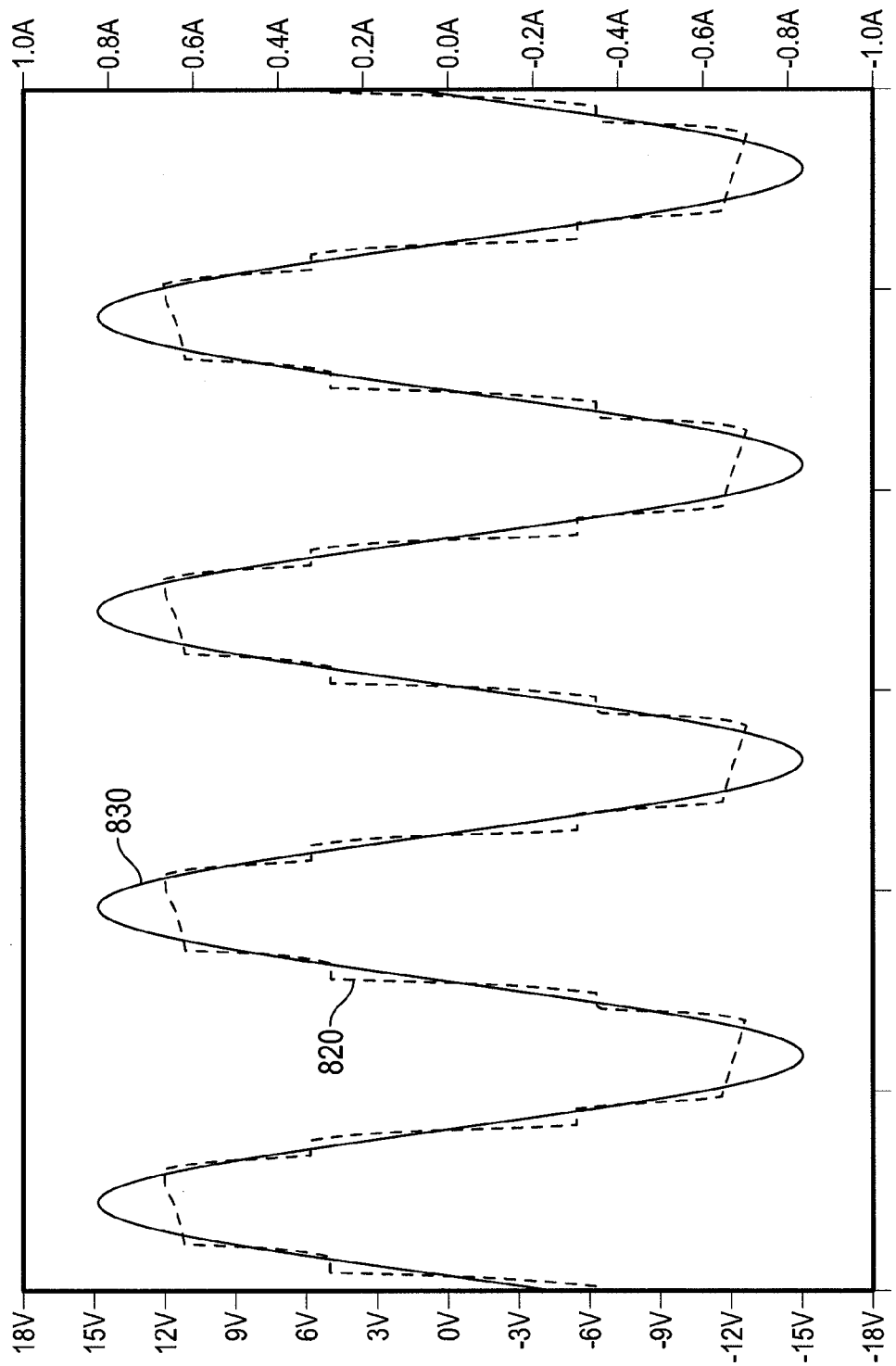
FIG. 8 is a plot of exemplary voltage and current waveforms of the system as shown in FIG. 7.

FIG. 8 is a plot of exemplary voltage and current waveforms 830 and 820 of the system 700 as shown in FIG. 7. As shown, the voltage waveform 830 provides an undistorted sinusoidal signal. While the current waveform 820 is distorted, the operation of the topologies of the system 700 shown in FIG. 7 provides a stepped current waveform that more closely approximates an undistorted sinusoidal, particularly as compared to the current waveform 320 of FIG. 3. As shown by the current waveform 820, the rectifier circuit topology of the system 700 of FIG. 7 may provide significant harmonic reductions and increased power factor.

As shown in FIG. 7, a variety of different topologies may be used for the first and second rectifier circuits 704a and 704b according to various operation conditions and for reducing harmonic distortions as much as possible according to the load driven by the system 700. As such, the first and second rectifier circuits 704a and 704b may include a combination of one or more rectifier circuits or other circuitry in combination with rectifier circuit topologies to produce the desired direct current output and for controlling the distortion of the current waveform 820.

Figure 9:
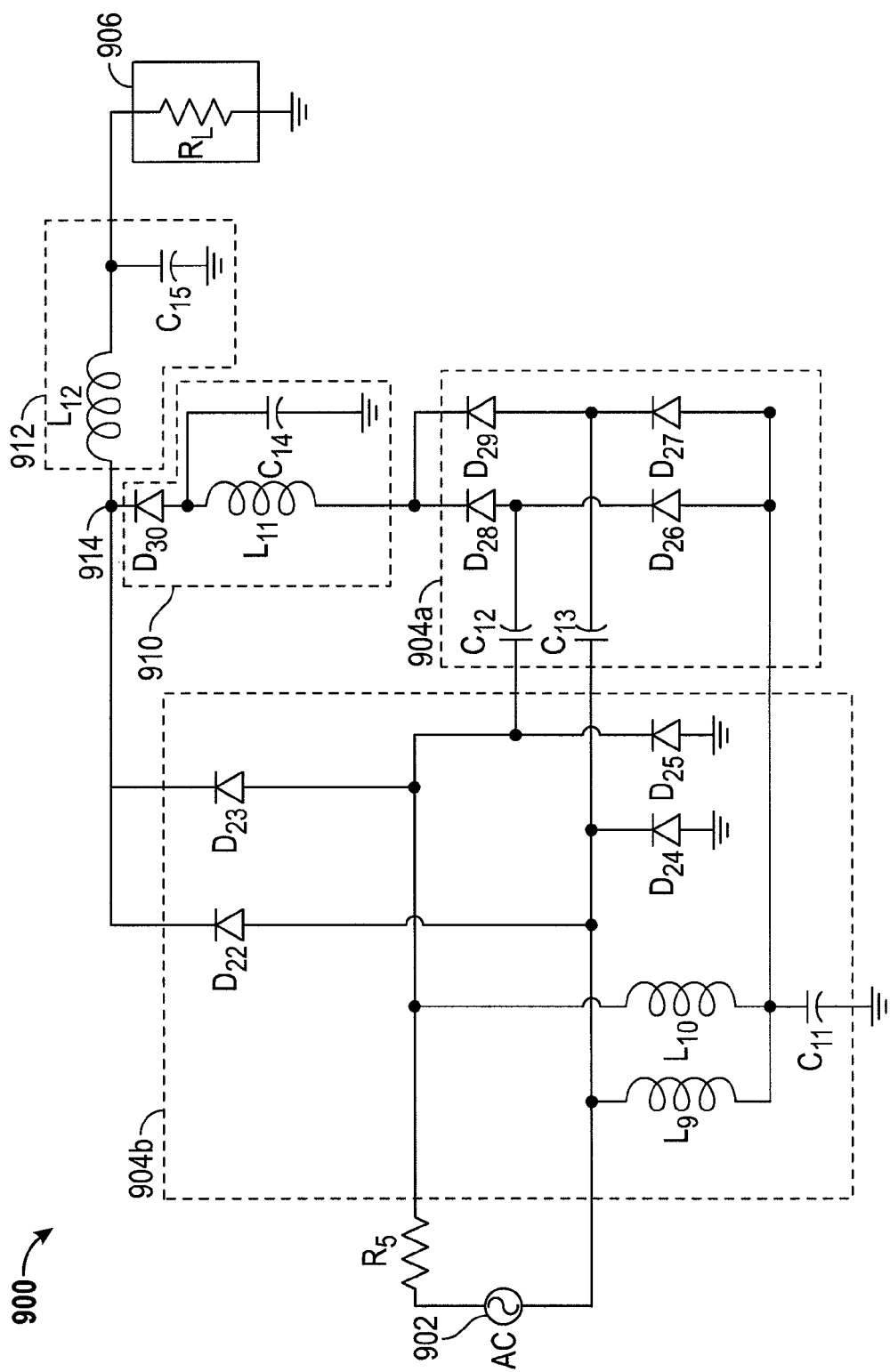
FIG. 9 is a schematic diagram of another exemplary system for AC to DC conversion.

FIG. 9 is a schematic diagram of another exemplary system 900 for AC to DC conversion, in accordance with one embodiment. FIG. 9 shows a schematic diagram of other exemplary first and rectifier circuits 904a and 904b that may be used in accordance with the system 400 of FIG. 4. As also described above with reference to FIG. 7, rather than using a single full wave bridge rectifier circuit 204 as shown in FIG. 2, a rectifier circuit topology including a combination of rectifier circuits may be used for providing a high power factor and a reduced harmonic filter. The first rectifier circuit 904a may include diodes $D_{26}$, $D_{27}$, $D_{28}$, and $D_{29}$ forming a full bridge rectifier circuit. Capacitors $C_{12}$ and $C_{13}$ may also be included as shown. The second rectifier circuit 904b may include diodes $D_{22}$, $D_{23}$, $D_{24}$, and $D_{25}$ forming a full bridge rectifier circuit. The second rectifier circuit 904b further includes a current doubler rectifier circuit including inductors $L_9$ and $L_{10}$ and diodes $D_{24}$ and $D_{25}$ that are in common with the full bridge rectifier circuit of the second rectifier circuit 904b. A capacitor $C_{11}$ may also be included as shown. In one embodiment, the current doubler rectifier circuit of the second rectifier circuit 904b may provide one and a half times the voltage of the first rectifier circuit 904a. As described above with reference to FIGS. 4, 5, and 7, the output of the first rectifier circuit 904a may be provided to an averaging circuit 910 as described above. The output of the averaging circuit may be electrically connected with the output of the first rectifier circuit 904b to produce a direct current. This direct current may be filtered and/or smoothed by a filter circuit 912 as described above to provide a more constant DC to the load $R_L$ 906.

Figure 10:
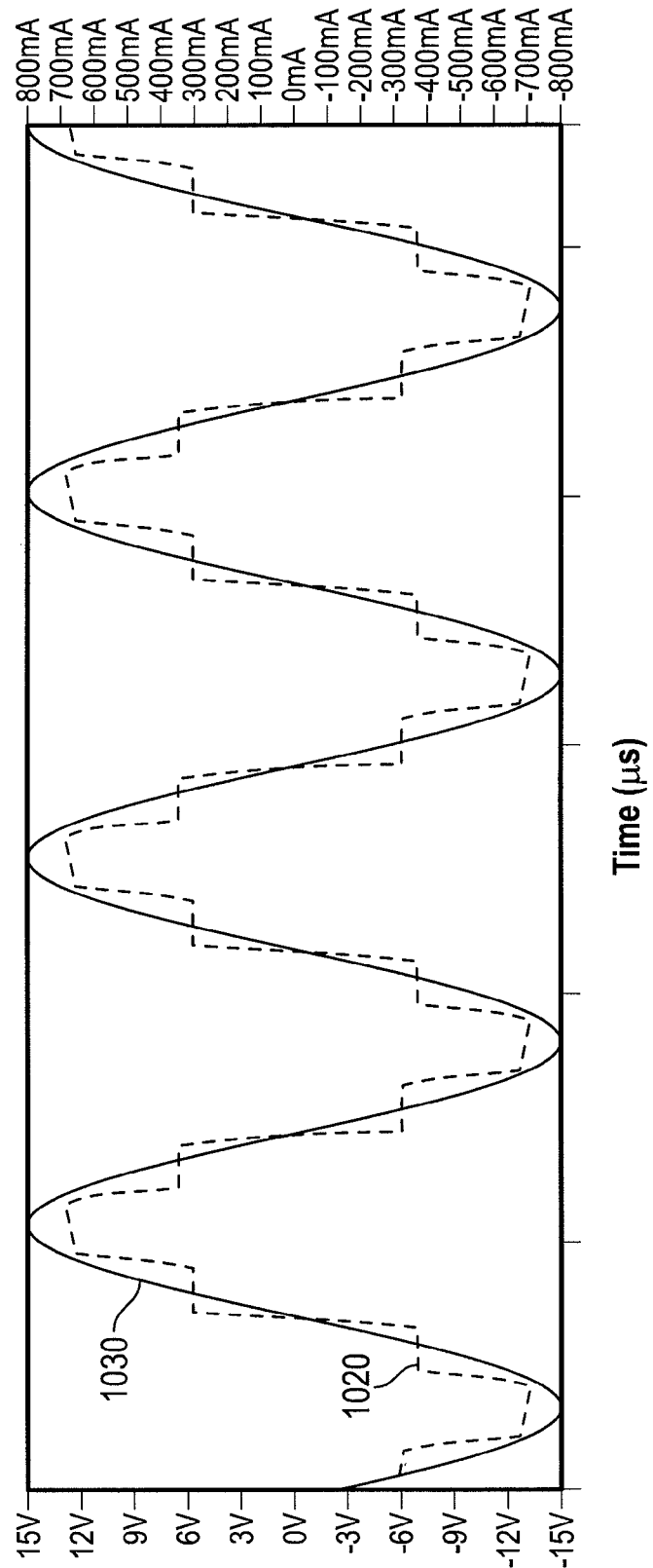
FIG. 10 is a plot of exemplary voltage and current waveforms of the system as shown in FIG. 9.

FIG. 10 is a plot of exemplary voltage and current waveforms 1030 and 1020 of the system 900 as shown in FIG. 9. As shown, the voltage waveform 1030 is shown as an undistorted sinusoidal. The operation of the rectifier topology of the system 900 of FIG. 9 creates a stepped current waveform that also more closely approximates a sine wave, particularly as compared to the current waveform 320 of FIG. 3. The system 900 may reduce the harmonic of the AC input (line) as described above. For example, the system 900 may provide a >30 db reduction in the third harmonic on the AC line, along with a 9 db reduction in the fifth harmonic. Similar levels of harmonic reduction may be achieved for any of the systems described above with reference to FIGS. 4, 5, and 7. The component values of the components of the system 900 may vary over a wide range for the inductances and capacitance. Furthermore, the system 900 may not be resonant and may therefore function using a wide range of input frequencies. As such, the system 900 may provide a high power factor and increase the efficiency of the system 900. As shown in FIG. 9, any of the first and second rectifier circuits 904a and 904b may individually include multiple rectifier circuits (e.g., rectifier circuit topologies) of different types to further control distortion of the current waveform according to the load 906 or other operating conditions. Using a combination of rectifier topologies as shown above may provide a current waveform with as minimum distortion as possible as compared to a sinusoid and avoid some of the harmonic/efficiency problems as described above. Furthermore, additional rectifier circuits may be cascaded to provide further increases in the power factor in some instances. For example, a third rectifier circuit (not shown) may be provided and electrically connected for use in conjunction with the first and second rectifier circuits 904a and 904b for further reduction of harmonics in the system 900 and increased power factor.

Figure 11:
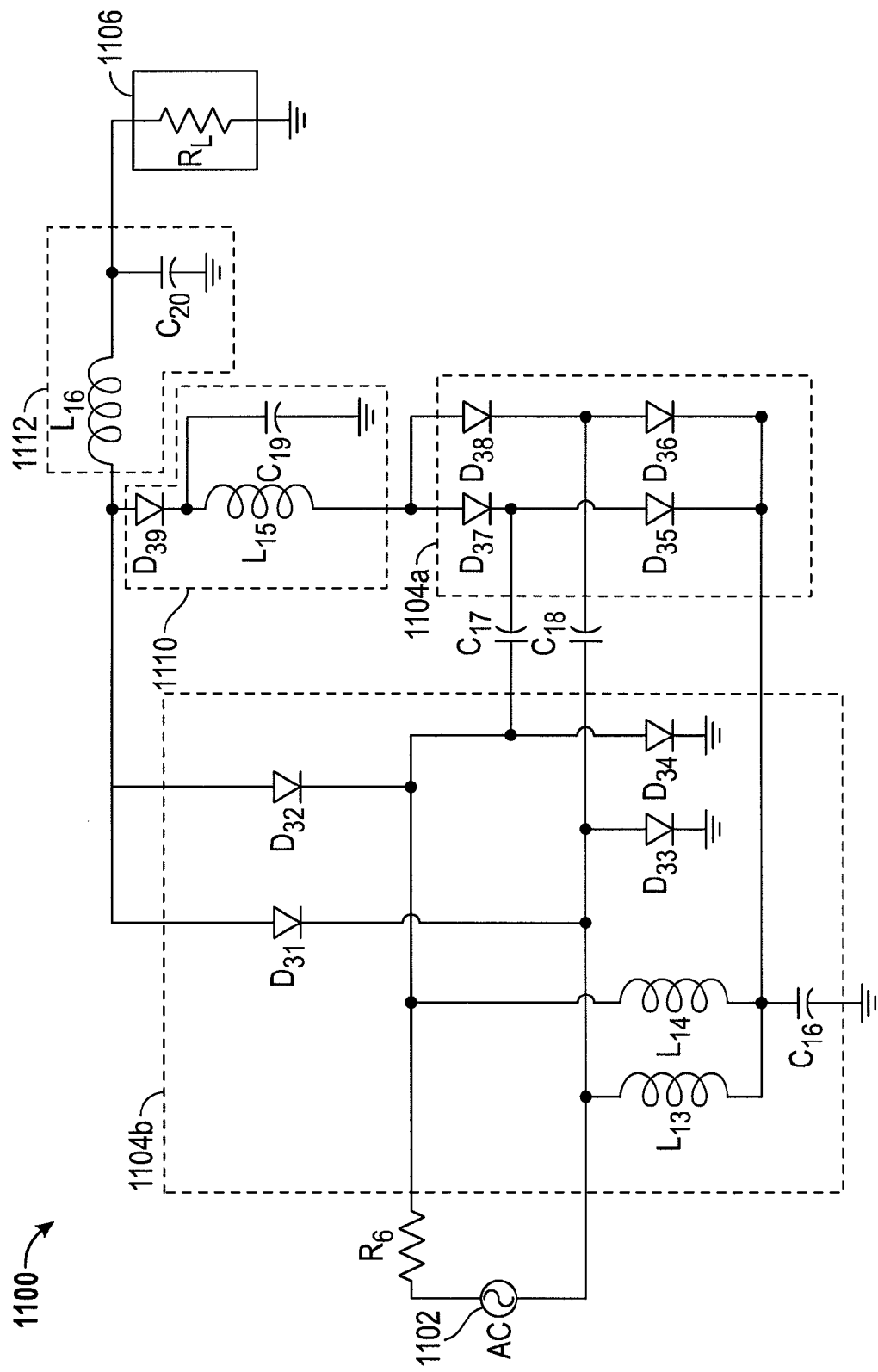
FIG. 11 is a schematic diagram of another exemplary system for AC to DC conversion.

FIG. 11 is a schematic diagram of another exemplary system 1100 for AC to DC conversion. FIG. 11 shows a similar circuit configuration as shown in FIG. 9, but where the direction of the diodes $D_{31}$, $D_{32}$, $D_{33}$, $D_{34}$, $D_{35}$, $D_{36}$, $D_{37}$, $D_{38}$, and $D_{39}$ have been reversed. While the output polarity may be opposite as compared to FIG. 9, the system 1100 may function in a similar manner as to the system 900 of FIG. 9 and still provide significant harmonic reduction. Similarly, the diodes of any of FIGS. 4, 5, and 7 may also be reversed without substantially changing the operation and benefits of the systems 400, 500, and 700. Other similar configurations are also possible in accordance with the principles described herein.

Figure 12:
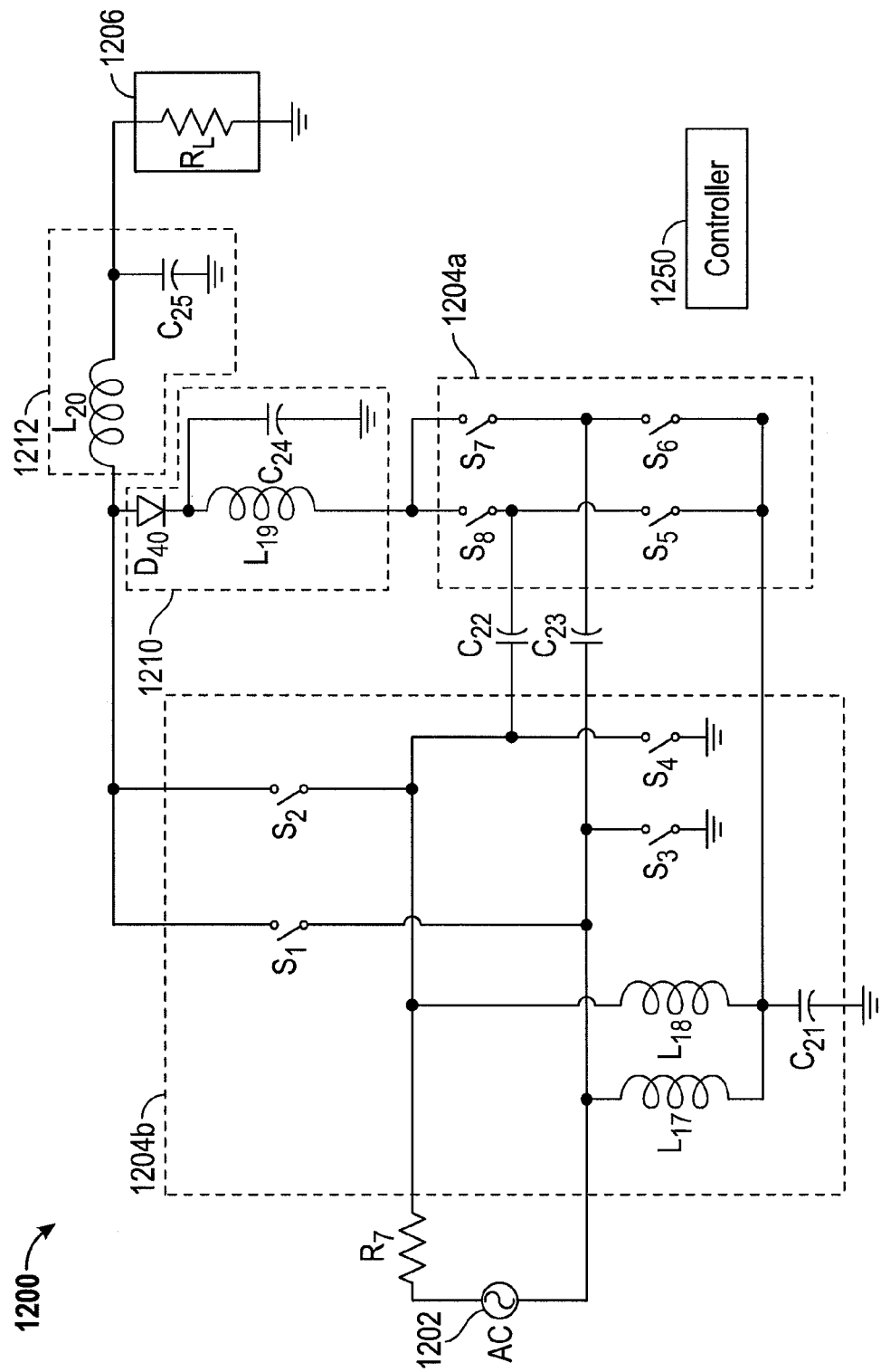
FIG. 12 is a schematic diagram of another exemplary system for AC to DC conversion.

FIG. 12 is a schematic diagram of another exemplary system 1200 for AC to DC conversion. FIG. 12 shows a similar circuit configuration as shown in FIG. 9, but where synchronous rectifier circuitry may be used. Accordingly, the diodes of FIG. 9 may be replaced with switches $S_1$, $S_2$, $S_3$, $S_4$, $S_5$, $S_6$, $S_7$, and $S_8$ driven by appropriate waveforms from a controller 1250 to perform a similar function as the diodes. The switches may be any one of a variety of different switches (e.g., relays, MOSFETs, BJTs, etc.). In some instances, using synchronous rectifier circuitry may allow for greater control over rectifier operation, particular when the operating conditions are dynamic. When driven with appropriate waveform for the switches $S_1$, $S_2$, $S_3$, $S_4$, $S_5$, $S_6$, $S_7$, and $S_8$, the system 1200 of FIG. 1 may function similarly to the system 900 of FIG. 9. In other embodiments, semi-synchronous rectifier circuitry may be used. For example, just a portion of the diodes of the rectifier circuits of FIG. 9 may be replaced with switches. Similarly, switches may be used in place of diodes for any of the circuits described above with reference to FIGS. 4, 5, and 7. Other similar configurations are also possible in accordance with the principles described herein.

The systems for AC to DC conversion described above with reference to FIGS. 4-12 may be used in a variety of other systems that involve using DC derived from an AC source. Accordingly to one exemplary embodiment, the systems for AC to DC conversion of FIGS. 4-12 may be used in systems for wireless power transfer that involve, for example, wirelessly receiving power in the form of a time varying voltage that produces an alternating current. Many applications that may use wirelessly received power rely on DC for powering a system or charging a battery. For example, wireless power may be used for wirelessly charging a battery of an electric vehicle as will be further described below or wirelessly charging electronic devices such as cell phones as will be further described below. As such, the description below provides examples of wireless power systems that may include the systems for AC to DC conversion as described above with reference to FIGS. 4-12. For example, each of the power sources described above with reference to FIGS. 4, 5, 7, 9, 11, and 12 may be a time varying voltage induced wirelessly via a field as will be described further below.

Non-contact wireless power transmission for charging or operation (e.g., powering) may be achieved by magnetic coupling between a primary coil of wire and a secondary coil of wire. The mechanism may be similar to that of an alternating current electric transformer where the power may be converted from an alternating electric current in the primary winding into an alternating magnetic field that is coupled by a magnetic circuit, usually made up of iron or iron bearing material, to a secondary winding where the magnetic field is converted back to an alternating electric current (AC). Other circuits convert the power received to direct current (DC) for charging the battery such as the circuits described above with reference to FIGS. 4-9.

The term "wireless power" is used herein to mean any form of energy associated with electric fields, magnetic fields, electromagnetic fields, or otherwise that is transmitted between a "transmit circuit" or transmitter and a "receive circuit" or receiver without the use of physical electrical conductors. Hereafter, all three of these will be referred to generically as fields, with the understanding that pure magnetic or pure electric fields do not radiate power. These must be coupled to a receive circuit to achieve power transfer.

Figure 13:
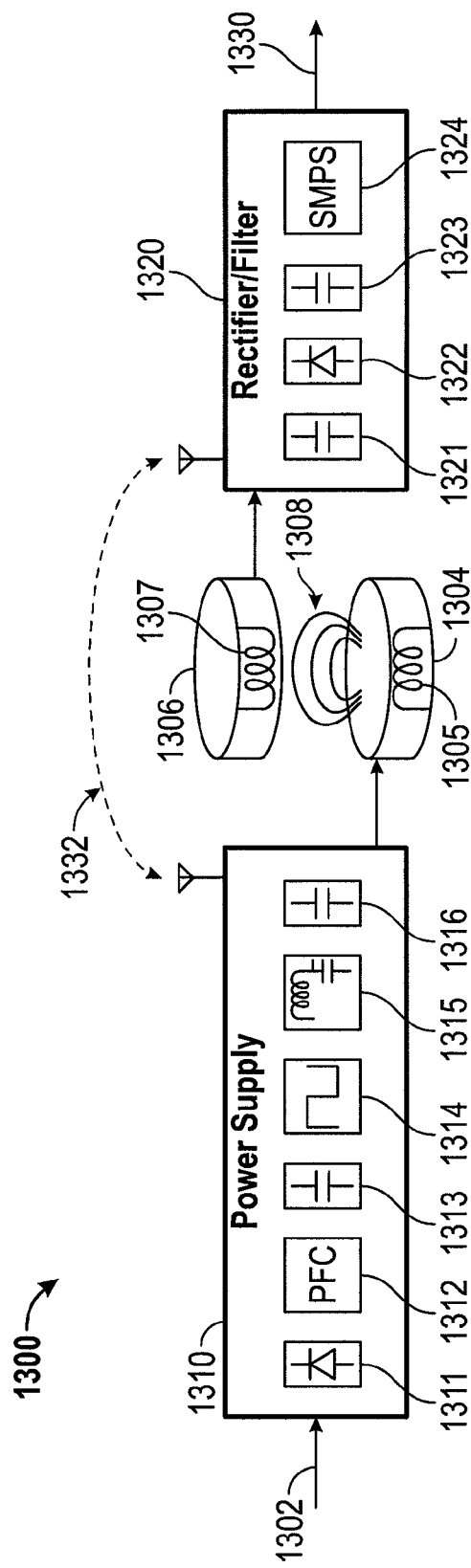
FIG. 13 is a functional block diagram of an exemplary wireless power transfer system that may include any of the systems for AC to DC conversion of FIGS. 4-12.

FIG. 13 is a functional block diagram of an exemplary wireless power transfer system 1300. As will be further described below, the systems described above with reference to FIGS. 4-12 may be used in the wireless power transfer system 1300. Input power 1302 is provided to a power supply 1310, which converts the input power 1302 to a form appropriate to drive a transmit circuit including a transmit coil 1304, which generates a field 1308 for providing energy transfer. A receive circuit including a receive coil 1306 couples to the field 1308 and generates electric power, which is rectified and filtered by a receive power conversion circuit 1320, which is converted for storing or consumption by a device (not shown) coupled to the output power 1330. Both the transmit coil 1304 and the receive coil 1306 are separated by a distance. In one exemplary embodiment, the transmit coil 1304 and receive coil 1306 are configured according to a mutual resonant relationship and when the resonant frequency of receive coil 1306 and the resonant frequency of transmit coil 1304 are very close, transmission losses between the transmit coil 1304 and the receive coil 1306 are minimal when the receive coil 1306 is located in the region where the majority of the flux lines of the field 1308 pass near or through the receive coil 1306.

The transmit coil 1304 and receive coil 1306 may be sized according to applications and devices to be associated therewith. Efficient energy transfer occurs by coupling a large portion of the energy of the field of the transmit coil 1304 to a receive coil 1306 rather than propagating most of the energy in an electromagnetic wave to the far field. When in this near field, a coupling mode may be developed between the transmit coil 1304 and the receive coil 1306. The area around the transmit coil 1304 and receive coil 1306 where this near field coupling may occur may be referred to herein as a coupling mode region.

In one embodiment as shown in FIG. 13, the power supply 1310 may receive utility power at 50/60 Hz 1302 and convert it to a high frequency AC to drive the transmit coil 1304. The power supply 1310 may include a rectifier 1311 that converts the utility AC power into pulsating DC. For large loads, such as an electric vehicle charger, power factor correction circuitry 1312 may be used to avoid excessive currents flowing in the utility grid. The pulsating DC may be filtered by a large energy storage element 1313 into a constant DC. The DC may then be converted to a high frequency square wave by a chopper circuit 1314 and filtered into a sine wave by filter 1315. This output may be then connected to a transmit coil 1304 of a transmit circuit. The high frequency AC current flowing in transmit coil 1304 may create a pulsating high frequency magnetic field 1308. The transmit coil 1304 and the capacitor 1316 may form a resonant circuit at the frequency of operation, producing better magnetic coupling between the transmit coil 1304 and the receive coil 1306.

A receive coil 1306 in a receive circuit couples to the pulsating high frequency field 1308 (e.g., magnetic field) and generates a high frequency AC power, which is connected to a receive power converter circuit 1320. The capacitor 1321 and inductor 1307 of the receive coil 1306 may form a resonant circuit at the frequency of operation, producing better magnetic coupling between the transmit coil 1304 and the receive coil 1306. The AC power is converted to pulsating DC by rectifier 1322. For example, the rectifier 1322 may include the rectifier circuitry of the systems described above with reference to FIGS. 4-9. An energy storage device 1323 may be included to smooth the pulsating DC into constant DC. A switch mode power supply 1324 may be included to adjust the voltage to a value appropriate for charging a battery (not shown) via the output power 1330. The power supply 1310 and receive power converter circuit 1320 may communicate by modulating the magnetic field 1308, or on a separate communication channel 1332 (e.g., Bluetooth, zigbee, cellular, NFC, etc).

As stated, efficient transfer of energy between the transmit coil 1304 and receive coil 1306 occurs during matched or nearly matched resonance between the transmit coil 1304 and the receive coil 1306 and are driven at that frequency by the power supply 1310. However, even when resonance between the transmit coil 1304 and receive coil 1306 are not matched, energy may be transferred, although the efficiency may be affected. Transfer of energy occurs by coupling energy from the near field of the transmit coil 1304 to the receive coil 1306 residing in the neighborhood where this near field is established rather than propagating the energy from the transmit coil 1306 into free space. The near-field may correspond to a region in which there are strong reactive fields resulting from the currents and charges in the transmit coil 1304 that do not radiate power away from the transmit coil 104*a*. In some cases, the near-field may correspond to a region that is within about one ½π wavelength of the transmit coil 1304 (and vice versa for the receive coil 1306) as will be further described below.

Figure 14:
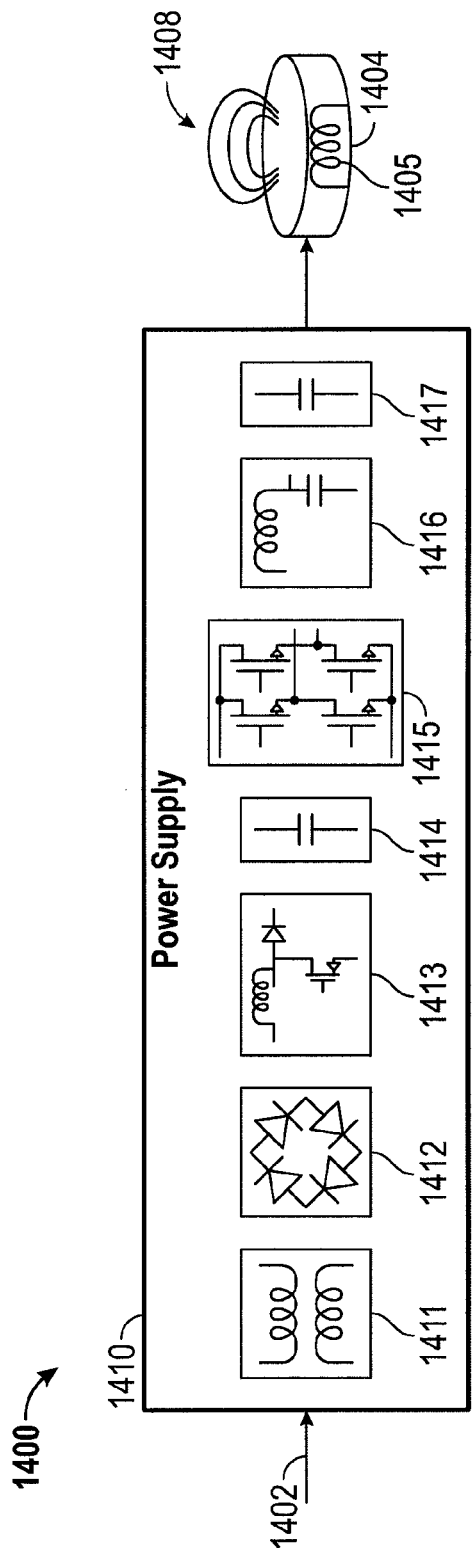
FIG. 14 is a functional block diagram of an exemplary wireless power transmitter system that may be used in the wireless power transfer system of FIG. 13.

FIG. 14 is a functional block diagram of an exemplary wireless power transmitter system 1400 that may be used in the wireless power transfer system 1300 of FIG. 13. FIG. 14 shows an exemplary configuration of a power supply that may include functionality required to convert 50/60 Hz utility grid power into a high frequency AC that may be used to drive the transmit circuit 1404, while other configurations are possible for other input power sources. 50/60 Hz utility grid power 1402 may be conditioned by a line filter 1411 to remove high frequency noise and damaging voltage spikes. A rectifier 1412 may convert the 50/60 Hz AC to pulsating DC. The rectifier 1412 may make use of any of the components/circuitry of the systems described above with reference to FIGS. 4-12.

An active power factor correction circuit 1413 may be included for regulatory purposes to avoid excess currents in the utility grid due to out of phase voltage and current and harmonic distortion due to the switching action of the rectifier 1412. The power factor correction circuit 1413 may regulate the flow of current from the utility grid so that it follows the utility grid voltage and appears as a resistive load with good power factor. The power factor correction circuit 1413 may be similar to a switch mode power supply that draws current from the utility grid in a series of high frequency pulses that are modulated to match the utility grid voltage waveform.

An energy storage element 1414 may be included and may be a very large capacitor or it may be composed of inductors and capacitors. In either case, the components may be large in order to store enough energy to last one half cycle of the 50/60 Hz utility grid power. Lower powered power supplies may omit the energy storage element 1414, but the resulting high frequency AC power that drives the transmit coil 1404 may then have a waveform of the rectified 50/60 Hz utility grid power superimposed as an envelope, leading to higher peak voltages and currents and higher peak magnetic fields. It may be desirable to avoid this at various power levels.

A chopper circuit 1415 may be used to convert the rectified and smoothed DC produced by the previous components 1411 to 1414 and may chop the smoothed DC into a square wave at the frequency of operation of the transmit circuit 1404. As an exemplary implementation, this frequency could be at 20 KHz, though any frequency could be used that leads to practical sized transmit coil 1404 and receive coil. Higher frequencies may allow smaller components to be used in both the power supply 1410 and the transmit coil 1404, while lower frequencies may lead to higher efficiency due to lower switching losses. Charging systems have been proposed to use frequencies in the range from 400 Hz to 1 MHz.

A matching circuit 1416 may be included to perform dual duty as a filter to convert the square wave generated by chopper circuit 1415 to a sine wave with suppressed harmonics and matches the impedance of the chopper circuit 1415 to the resonant circuit made up of capacitor 1417 and the inductor 1405 of the transmit coil 1404. Since the matching circuit 1416 is operating at a high frequency, the components may be relatively small, but must be of high quality to avoid losses. Capacitor 1417 may be in parallel with or series with the inductor 1405 in the transmit circuit 1404, but in any case may be of the highest quality to avoid loss as the current flowing in this device is multiplied by the operating Q of the resonant circuit. Similarly, the inductor 1405 in the transmit circuit 1406 may be composed of high quality components to avoid loss. Litz wire may be used to increase surface area and make maximum use of the copper in the winding. Alternately the coil transmit coil 1404 may be made of a metallic strip with the thickness, width and metal type selected to keep resistive losses low. Ferrite material used for the magnetic circuit may be selected to avoid saturation, eddy currents and loss at the frequency of operation.

The power supply 1410 may further include a load sensing circuit (not shown) for detecting the presence or absence of active receive coils in the vicinity of the magnetic field 1408 generated by the transmit coil 1404. By way of example, a load sensing circuit monitors the current flowing to the chopper circuit 1415, which is affected by the presence or absence of a properly aligned receive coil in the vicinity of the magnetic field 1408. Detection of changes to the loading on the chopper circuit 1415 may be monitored by a controller, not shown, for use in determining whether to enable the power factor correction circuit 1413 for transmitting energy and to communicate with an active receive coil. A current measured at chopper circuit 1415 may be further used to determine whether an invalid object is positioned within a charging region of transmit coil 1404.

Figure 15:
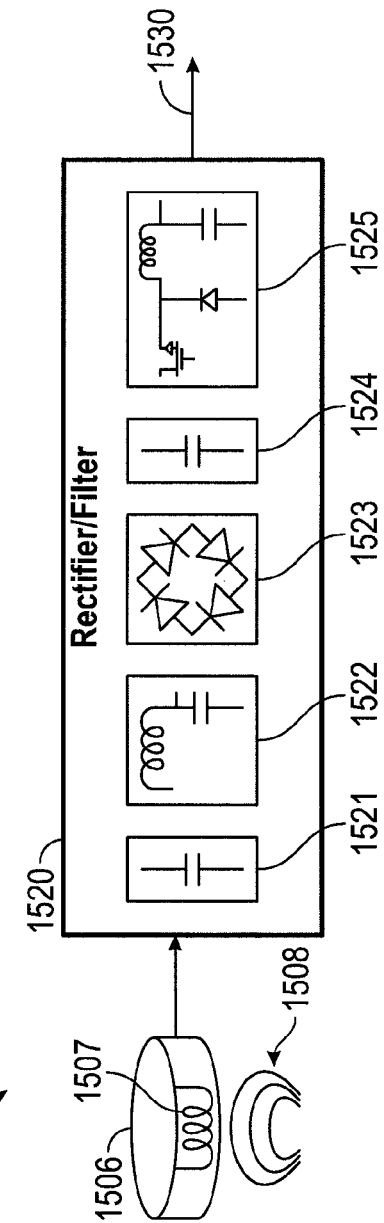
FIG. 15 is a functional block diagram of an exemplary wireless power receiver system that may be used in the wireless power transfer system of FIG. 13 and that may use of the systems for AC to DC conversion of FIGS. 4-12.

FIG. 15 is a functional block diagram of an exemplary wireless power receiver system 1500 that may be used in the wireless power transfer system 1300 of FIG. 13 and that may use of the systems for AC to DC conversion of FIGS. 4-12. The receiver system 1500 may convert the high frequency magnetic field 1508 into a high frequency AC power that is converted to DC power 1530 used to charge a battery (not shown) or power a device (not shown). The receive coil 1506 includes an inductor 1507 that together with capacitor 1521 forms a resonant circuit. The comments of component quality for inductor 1507 and capacitor 1521 described above with reference to FIG. 14 apply here also. A matching circuit 1522 may perform a similar function to matching circuit 1413 only in reverse where the high frequency AC power generated by the receive coil 1506 is impedance matched to a rectifier 1523 and the harmonics generated by the rectifier 1523 are not coupled to the receive circuit 1506. The rectifier circuit 1523 may be used to reduce the harmonics generated by the rectifying action and reduce the filtering requirements on the matching circuit 1522. For example, the rectifier circuit 1523 may make use and/or include the components and topologies of the systems described above with reference to FIGS. 14-12. This may allow for providing a high power factor to increase the efficiency of power conversion to wirelessly receive power and provide that power to a load (e.g., a battery for charging).

An energy storage element 1524 may be used to smooth pulsating DC into constant DC. The energy storage element 1524 may operate at high frequencies (as compared to the energy storage element 1414 of FIG. 14) so components may be smaller. A switch mode power supply 1525 may be used to regulate the DC voltage and possibly the DC current in response to a battery management system (not shown). As an alternative, the regulating function of the switch mode power supply 1525 may be provided within at the transmitter within the power supply 1410, but this approach may depend on a fast and reliable communications link from the receiver system 1400 to the power supply 1410 and may add complexity to the whole system.

Figure 16:
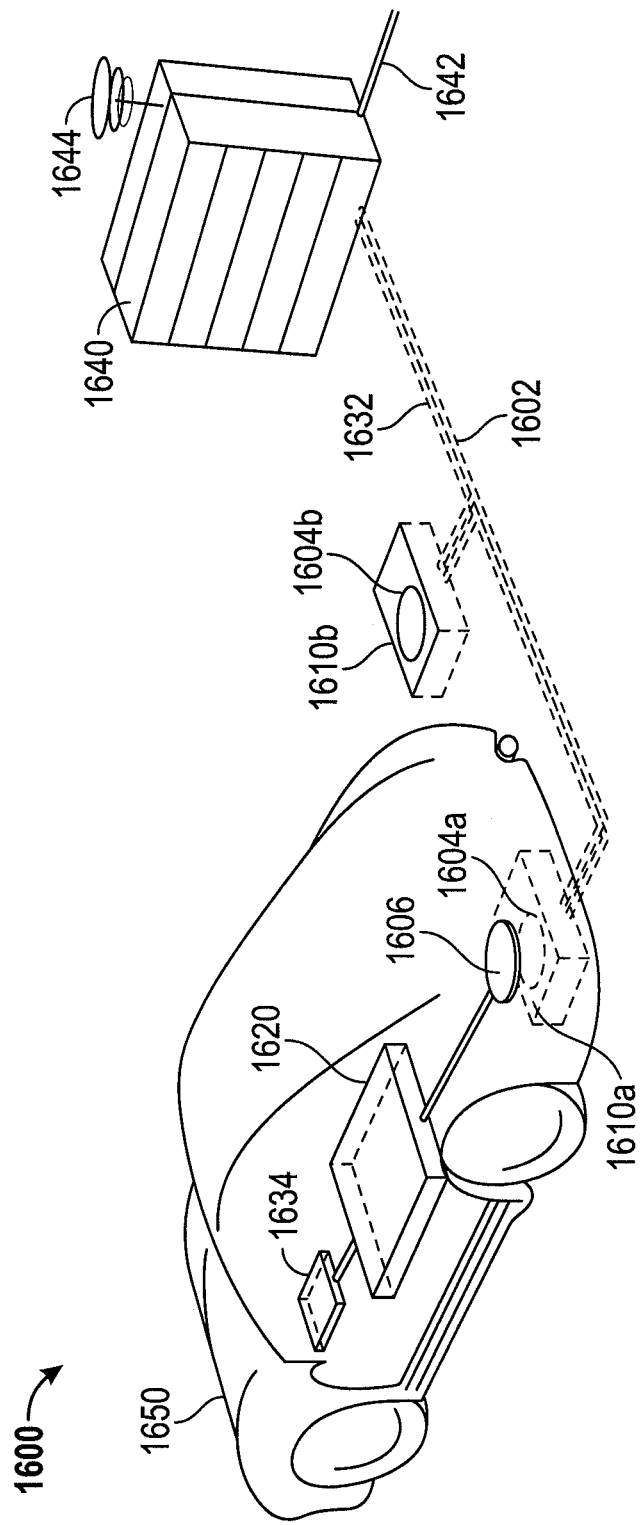
FIG. 16 is a diagram of an exemplary system for charging an electric vehicle that may include the wireless power transfer system of FIG. 13.

FIG. 16 is a diagram of an exemplary system for charging an electric vehicle 1650 that may include the wireless power transfer system 1300 of FIG. 13. The wireless power transfer system 1600 enables charging of an electric vehicle 1650 while the electric vehicle 1650 is parked near a charging base system 1610a. Spaces for two electric vehicles are illustrated in a parking area to be parked over corresponding charging base systems 1610a, 1610b. In some embodiments, a local distribution center 1640 may be connected to a power backbone 1642 and configured to provide an alternating current (AC) or a direct current (DC) supply through a power link (or power supply) 1602 to the charging base system 1610a. The charging base system 1610a also includes a transmit coil 1604a as described above for wirelessly transferring or receiving power. An electric vehicle 1612 may include a battery unit 1634, a receive coil 1606, and a receiver power conversion circuit 1620. The receive coil 1606 may interact with the transmit coil 1604a to wirelessly transfer power as described above.

Either the transmit coil 1604 or the receive coil 1606 may also be referred to or be configured as a "loop" antenna. The transmit coil 1604 or the receive coil 1606 may also be referred to herein or configured as a "magnetic" antenna or an induction coil. The term "coil" is intended in one aspect to refer to a component that may wirelessly output or receive energy for coupling to another "coil." The coil may also be referred to as an "antenna" of a type that is configured to wirelessly output or receive power.

Local distribution center 1640 may be configured to communicate with external sources (e.g., a power grid) via a communication backhaul 1642, and with the charging base system 1610a via a communication link 1632.

In some embodiments the receive coil 1606 may be aligned with the transmit coil 1604a and, therefore, disposed within a near-field region simply by the driver positioning the electric vehicle 1650 correctly relative to the transmit coil 1604a. In other embodiments, the driver may be given visual feedback, auditory feedback, or combinations thereof to determine when the electric vehicle 1650 is properly placed for wireless power transfer. In yet other embodiments, the electric vehicle 1650 may be positioned by an autopilot system, which may move the electric vehicle 1650 back and forth (e.g., in zig-zag movements) until an alignment error has reached a tolerable value. This may be performed automatically and autonomously by the electric vehicle 1650 without or with only minimal driver intervention provided that the electric vehicle 1650 is equipped with a servo steering wheel, ultrasonic sensors, and intelligence to adjust the vehicle. In still other embodiments, the receive coil 1606, the transmit coil 1604a, or a combination thereof may have functionality for displacing and moving the coils 1606 and 1604a relative to each other to more accurately orient them and develop more efficient coupling therebetween.

The charging base system 1610a may be located in a variety of locations. As non-limiting examples, some suitable locations include a parking area at a home of the electric vehicle owner, parking areas reserved for electric vehicle wireless charging modeled after conventional petroleum-based filling stations, and parking lots at other locations such as shopping centers and places of employment.

Charging electric vehicles wirelessly provide numerous benefits. For example, charging may be performed automatically, virtually without driver intervention and manipulations thereby improving convenience to a user. There may also be no exposed electrical contacts and no mechanical wear out, thereby improving reliability of the wireless power transfer system 1600. Manipulations with cables and connectors may not be needed, and there may be no cables, plugs, or sockets that may be exposed to moisture and water in an outdoor environment, thereby improving safety. There may also be no sockets, cables, and plugs visible or accessible, thereby reducing potential vandalism of power charging devices. Further, since electric vehicles may be used as distributed storage devices to stabilize a power grid, a convenient docking-togrid solution may be desirable to increase availability of vehicles for vehicle-to-grid (V2G) operations.

A wireless power transfer system 1600 may also provide aesthetical and non-impedimental advantages. For example, there may be no charge columns and cables that may be impedimental for vehicles and/or pedestrians.

Figure 17:
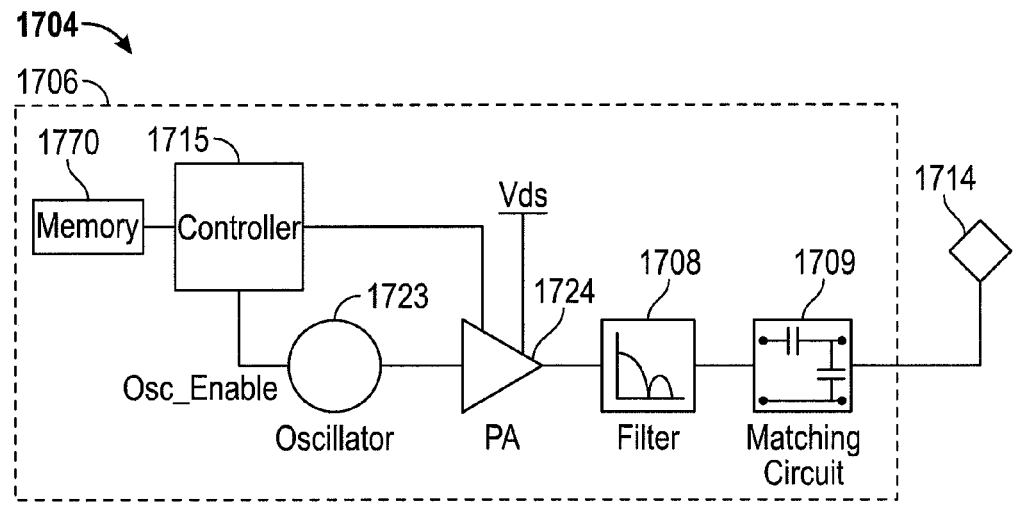
FIG. 17 is a functional block diagram of another exemplary wireless power transmitter.

In other embodiments, a wireless power transfer system may be used to charge a variety of rechargeable electronic devices or other devices that may operate using wirelessly received power. FIG. 17 is a functional block diagram of another exemplary wireless power transmitter 1704. The transmitter 1704 may include transmit circuitry 1706 and a transmit coil 1714. Transmit circuitry 1706 may provide RF power to the transmit coil 1714 by providing an oscillating signal resulting in generation of energy (e.g., magnetic flux) about the transmit coil 1714 as described above. Transmitter 1704 may operate at any suitable frequency. By way of example, transmitter 1704 may operate at the 13.56 MHz ISM band.

As described above, transmit circuitry 1706 may include a fixed impedance matching circuit 1709 and a filter circuit 1708 configured to reduce harmonic emissions to levels to prevent self-jamming of devices coupled to receivers. Other exemplary embodiments may include different filter topologies, including but not limited to, notch filters that attenuate specific frequencies while passing others and may include an adaptive impedance match, that may be varied based on measurable transmit metrics, such as output power to the coil 1714 or DC current drawn by the driver circuit 1724. Transmit circuitry 1706 further includes a driver circuit 1724 configured to drive an RF signal as determined by an oscillator 1723. The transmit circuitry 1706 may be comprised of discrete devices or circuits, or alternately, may be comprised of an integrated assembly. An exemplary RF power output from transmit coil 1714 may be on the order of 2.5 Watts for charging electronic devices.

Transmit circuitry 1706 may further include a controller 1715 for selectively enabling the oscillator 1723 during transmit phases (or duty cycles) for specific receivers, for adjusting the frequency or phase of the oscillator 1723, and for adjusting the output power level for implementing a communication protocol for interacting with neighboring devices through their attached receivers. It is noted that the controller 1515 may also be referred to herein as processor 1715. Adjustment of oscillator phase and related circuitry in the transmission path may allow for reduction of out of band emissions, especially when transitioning from one frequency to another. The transmitter 1704 may be integrated into a charging pad for wirelessly charging a variety of portable electronic devices.

Figure 18:
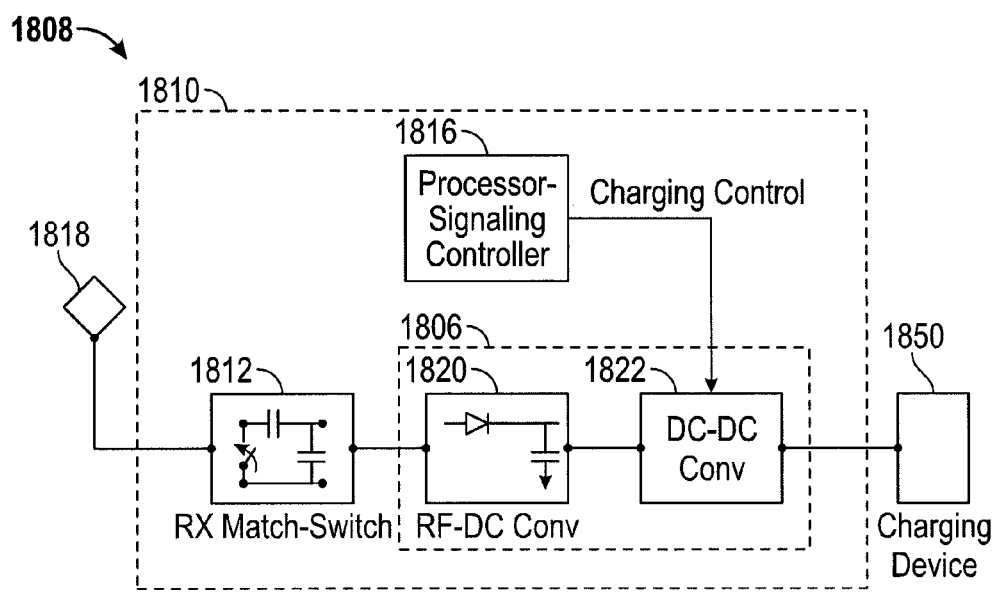
FIG. 18 is a functional block diagram of another exemplary wireless power receiver that may use any of the systems for AC to DC conversion of FIGS. 4-12.

FIG. 18 is a functional block diagram of another exemplary wireless power receiver 1808 that may use any of the systems for AC to DC conversion of FIGS. 4-12. The receiver 1808 includes receive circuitry 1810 that may include a receive coil 1818. Receiver 1808 further couples to device 1850 for providing received power thereto. It should be noted that receiver 1808 is illustrated as being external to device 1850 but may be integrated into device 1850. Energy may be propagated wirelessly to receive coil 1818 and then coupled through the rest of the receive circuitry 1810 to device 1850. By way of example, the charging device may include devices such as mobile phones, portable music players, laptop computers, tablet computers, computer peripheral devices, communication devices (e.g., Bluetooth devices), digital cameras, hearing aids (an other medical devices), and the like.

Receive coil 1818 may be tuned to resonate at the same frequency, or within a specified range of frequencies, as transmit coil 1714 (FIG. 17). Receive coil 1818 may be similarly dimensioned with transmit coil 1814 or may be differently sized based upon the dimensions of the associated device 1850. By way of example, device 1850 may be a portable electronic device having diametric or length dimension smaller that the diameter of length of transmit coil 1714. In such an example, receive coil 1818 may be implemented as a multi-turn coil in order to reduce the capacitance value of a tuning capacitor (not shown) and increase the receive coil's impedance. By way of example, receive coil 1818 may be placed around the substantial circumference of device 1850 in order to maximize the coil diameter and reduce the number of loop turns (i.e., windings) of the receive coil 1818 and the inter-winding capacitance.

As described above with reference to FIG. 17, receive circuitry 1810 may provide an impedance match to the receive coil 1818. As also described above, receive circuitry 1810 includes power conversion circuitry 1806 for converting a received RF energy source into, charging power for use by the device 1850. Power conversion circuitry 1806 includes an RF-to-DC converter 1820 (e.g., rectifier) and may also in include a DC-to-DC converter 1822 (regulator) as described above. The RF-to-DC converter 1820 may make use of some or all of the circuitry as described above with reference to FIGS. 4-12 to provide a high power factor and reduction of harmonic content. Receive circuitry 1810 may further include switching circuitry 1812 for connecting receive coil 1818 to the power conversion circuitry 1806 or alternatively for disconnecting the power conversion circuitry 1806. Disconnecting receive coil 1818 from power conversion circuitry 1806 not only suspends charging of device 1850, but also changes the "load" as "seen" by the transmitter 1704 (FIG. 17). Receive circuitry 1810 further includes processor 1816 for coordinating the processes of receiver 1808 described herein including the control of switching circuitry 1812 described herein. Processor 1816 may also adjust the DC-to-DC converter 1822 for improved performance.

It should be appreciated while the figures above show an example of various wireless charging systems, the system and method described herein may apply equally to a charging system using a non-wireless connection. For example, a transmission line may be directly connected between systems to charge the battery (not shown).

Figure 19:
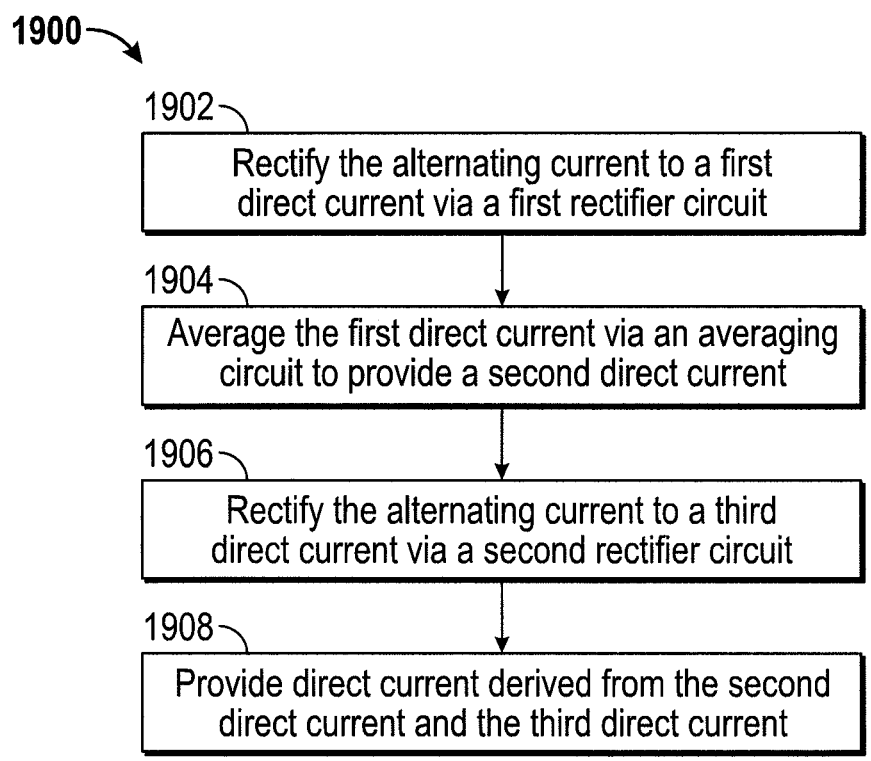
FIG. 19 is a flowchart of an exemplary method for converting AC to DC.

FIG. 19 is a flowchart of an exemplary method 1900 for converting AC to DC. While described with reference to FIG. 4, the method 1900 may be used in conjunction with any of the systems described with reference to FIGS. 5, 7, 9, 11, and 12-18. At block 1902, alternating current from a power source 402 is rectified to a first direct current via a first rectifier circuit 404a. At block 1904, the first direct current is averaged via an averaging circuit 410 to provide a second direct current. The averaging circuit 410 may comprise an inductor and a capacitor. At block 1906, the alternating current is also rectified to a third direct current via a second rectifier circuit 404b. The first and second rectifier circuits 404a and 404b may include full wave rectifier circuits and may share components. Each of the first and second rectifier circuits 404a and 404b may include a rectifier topology including a combination of rectifier circuits.

At block 1908, direct current derived from the second direct current and the third direct current is provided. For example, the outputs of the averaging circuit 410 and the second rectifier circuit 404b may be electrically connected so that the second and the third direct current are combined. The direct current derived from the second direct current and third direct current may be provided to power or charge a load 406. The method 1900 may further include generating the alternating current based at least partially on wirelessly received power. For example, the power source 402 may comprise a coil configured to wirelessly receive power as a time varying voltage is induced to produce an alternating current. In some embodiments, the method may further include filtering the direct current via a filter circuit to smooth the DC to a constant level.

Figure 20:
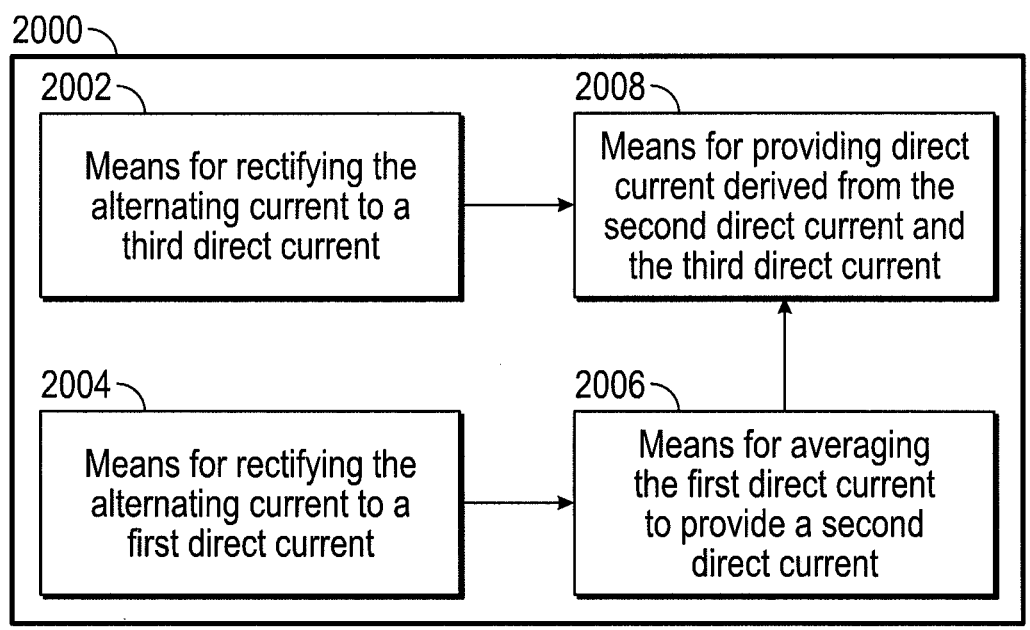
FIG. 20 shows another exemplary functional block diagram of a system for AC to DC conversion.

FIG. 20 shows another exemplary functional block diagram of a system for AC to DC conversion. The system may include a power conversion apparatus 2000 comprising means 2002, 2004, 2006, and 2008 for the various actions discussed with respect to FIGS. 1-19.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations. For example, means for rectifying may comprise a rectifier circuit that may be any of the rectifier circuits described above or any combination thereof. Furthermore, means for averaging may comprise an averaging circuit. Means for providing the direct current may comprise the circuitry as described above with reference to FIGS. 4-12.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments of the invention.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A power conversion apparatus for providing a direct current (DC) based at least in part on an alternating current, comprising:
a first rectifier circuit configured to rectify the alternating current to a first direct current;
an averaging circuit configured to average the first direct current received from the first rectifier circuit and to provide a second direct current; and
a second rectifier circuit configured to rectify the alternating current to a third direct current, the direct current being derived from the second direct current and the third direct current,
wherein one or both of the first rectifier circuit and the second rectifier circuit comprise a rectifier topology comprising a combination of rectifier circuits, wherein the rectifier topology comprises a full wave rectifier circuit electrically connected in series with a current doubler circuit, the current doubler circuit comprising two inductors and two diodes.

2. The power conversion apparatus of claim 1, further comprising a filter circuit comprising an inductor and a capacitor configured to filter the direct current.

3. The power conversion apparatus of claim 1, wherein the averaging circuit is configured to provide less than a peak voltage level of an output of the second rectifier circuit.

4. The power conversion apparatus of claim 1, wherein the averaging circuit comprises an inductor and a capacitor.

5. The power conversion apparatus of claim 4, wherein the inductor is electrically connected in parallel with the capacitor.

6. The power conversion apparatus of claim 1, wherein at least one of the first rectifier circuit and the second rectifier circuit comprises a full wave rectifier circuit.

7. The power conversion apparatus of claim 6, wherein each of the full wave rectifier circuits comprises four diodes, and wherein two diodes of the four diodes are shared between the first rectifier circuit and the second rectifier circuit.

8. The power conversion apparatus of claim 1, wherein the direct current is provided to power or charge a load.

9. The power conversion apparatus of claim 1, wherein the alternating current is generated based at least partially on wirelessly received power.

10. The power conversion apparatus of claim 9, further comprising a coil configured to wirelessly receive the wirelessly received power and to generate the alternating current.

11. A method for power conversion for providing a direct current (DC) based at least in part on an alternating current, comprising:
rectifying the alternating current to a first direct current via a first rectifier circuit;
averaging the first direct current via an averaging circuit to provide a second direct current;
rectifying the alternating current to a third direct current via a second rectifier circuit; and
providing the direct current derived from the second direct current and the third direct current,
wherein one or both of the first rectifier circuit and the second rectifier circuit comprise a rectifier topology comprising a combination of rectifier circuits, wherein the rectifier topology comprises a full wave rectifier circuit electrically connected in series with a current doubler circuit, the current doubler circuit comprising two inductors and two diodes.

12. The method of claim 11, further comprising filtering the direct current via an inductor and a capacitor.

13. The method of claim 11, wherein averaging comprises providing less than a peak voltage of an output of the second rectifier circuit.

14. The method of claim 11, wherein the averaging circuit comprises an inductor and a capacitor.

15. The method of claim 11, wherein at least one of the first rectifier circuit and the second rectifier circuit comprises a full wave rectifier circuit.

16. The method of claim 15, wherein each of the full wave rectifier circuits comprises four diodes, and wherein two diodes of the four diodes are shared between the first rectifier circuit and the second rectifier circuit.

17. The method of claim 11, further comprising powering or charging a load using the direct current.

18. The method of claim 11, further comprising generating the alternating current based at least partially on wirelessly received power.

19. The method of claim 18, wherein generating comprises generating the alternating current via a coil configured to wirelessly receive the wirelessly received power.

20. A power conversion apparatus for providing a direct current (DC) based at least part on an alternating current, comprising:
a first means for rectifying the alternating current to a first direct current;
means for averaging the first direct current to provide a second direct current;
a second means for rectifying the alternating current to a third direct current; and
means for providing the direct current derived from the second direct current and the third direct current,
wherein one or both of the first means for rectifying and the second means for rectifying comprise a rectifier topology comprising a combination of rectifier circuits, wherein the rectifier topology comprises a full wave rectifier circuit electrically connected in series with a current doubler circuit, the current doubler circuit comprising two inductors and two diodes.

21. The power conversion apparatus of claim 20, further comprising a filter circuit comprising an inductor and a capacitor configured to filter the direct current.

22. The power conversion apparatus of claim 20, wherein means for averaging comprises means for providing less than a peak voltage of an output of the second means for rectifying.

23. The power conversion apparatus of claim 20, wherein means for averaging comprises an averaging circuit comprising an inductor and a capacitor.

24. The power conversion apparatus of claim 23, wherein the inductor is electrically connected in parallel with the capacitor.

25. The power conversion apparatus of claim 20, wherein the first means for rectifying comprises a first rectifier circuit, wherein the second means for rectifying comprises a second rectifier circuit, and wherein at least one of the first rectifier circuit and the second rectifier circuit comprises a full wave rectifier circuit.

26. The power conversion apparatus of claim 25, wherein each of the full wave rectifier circuits comprises four diodes, and wherein two diodes of the four diodes are shared between the first rectifier circuit and the second rectifier circuit.

27. The power conversion apparatus of claim 20, wherein the direct current is provided to power or charge a load.

28. The power conversion apparatus of claim 20, wherein the alternating current is configured to be generated based at least partially on wirelessly received power.

29. The power conversion apparatus of claim 28, further comprising a coil configured to wirelessly receive the wirelessly received power and to generate the alternating current.

30. A power conversion apparatus for providing a direct current (DC) based at least in part on an alternating current, comprising:
a first rectifier circuit;
a filter circuit coupled to the first rectifier circuit comprising an inductor and a capacitor; and
a second rectifier circuit comprising:
a current doubler rectifier circuit comprising two inductors and two diodes; and
a full bridge rectifier circuit electrically coupled in series with the current doubler circuit, wherein the two diodes of the current doubler rectifier are shared with the full bridge rectifier of the second rectifier circuit, wherein the output of the second rectifier circuit is coupled to the output of the filter circuit.

31. The apparatus of claim 30, wherein the filter circuit is configured to average the output of the first rectifier circuit.

* * * * *